(12) United States Patent
Takahashi et al.

(10) Patent No.: US 6,259,705 B1
(45) Date of Patent: Jul. 10, 2001

(54) NETWORK SERVICE SERVER LOAD BALANCING DEVICE, NETWORK SERVICE SERVER LOAD BALANCING METHOD AND COMPUTER-READABLE STORAGE MEDIUM RECORDED WITH NETWORK SERVICE SERVER LOAD BALANCING PROGRAM

(75) Inventors: Eiichi Takahashi; Akira Hosoi; Takuya Yamada, all of Kawasaki; Masuhiro Koide, Shizuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/048,156

(22) Filed: Mar. 26, 1998

(30) Foreign Application Priority Data

Sep. 22, 1997 (JP) .................................................. 9-257393

(51) Int. Cl.[7] ........................................................ H04J 3/16
(52) U.S. Cl. .......................... 370/465; 370/230; 370/235; 370/401
(58) Field of Search .................................. 370/228, 230, 370/231, 232, 234, 235, 401, 450, 465, 468, 252

(56) References Cited

U.S. PATENT DOCUMENTS

| 5,742,587 | * | 4/1998 | Zornig et al. ........................ 370/235 |
| 5,850,517 | * | 12/1998 | Verkler et al. ........................ 370/401 |
| 5,864,535 | * | 1/1999 | Basilico ................................ 370/231 |
| 5,872,930 | * | 2/1999 | Masters et al. ........................ 370/228 |
| 5,982,780 | * | 11/1999 | Bohm et al. .......................... 370/450 |

* cited by examiner

Primary Examiner—Douglas Olms
Assistant Examiner—Shick Hom
(74) Attorney, Agent, or Firm—Staas & Halsey LLP

(57) ABSTRACT

For use with a system in which data is transferred from a first control unit to a plurality of second control units over a network, a network load balancing device comprises: a conversion information storage unit which stores conversion information representing a correspondence relationship of the first control unit to one of the second control unit; a distributive relay unit which transfers data sent by the first control unit to one or more of the second control units on the basis of the correspondence relationship stored in the conversion information storage unit; a distribution ratio adjusting unit which adjusts the correspondence relationship in the conversion information stored in the conversion information storage unit; and a load measuring unit which measures the load on each of the second control units and notifies the distribution ratio adjusting unit of the measurements to allow the unit to adjust the correspondence relationship in the conversion information stored in the conversion information storage unit.

26 Claims, 30 Drawing Sheets

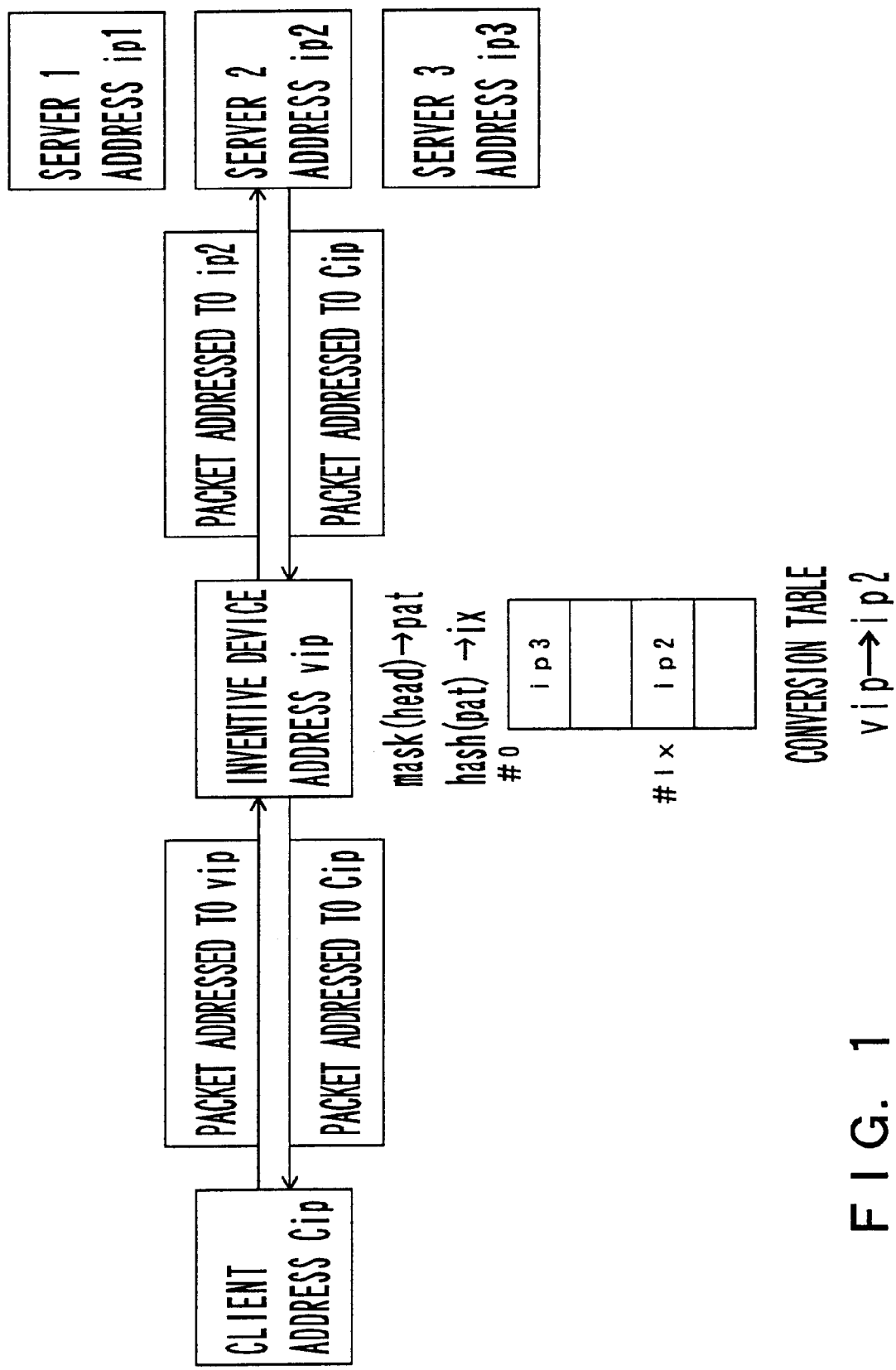
F I G. 1

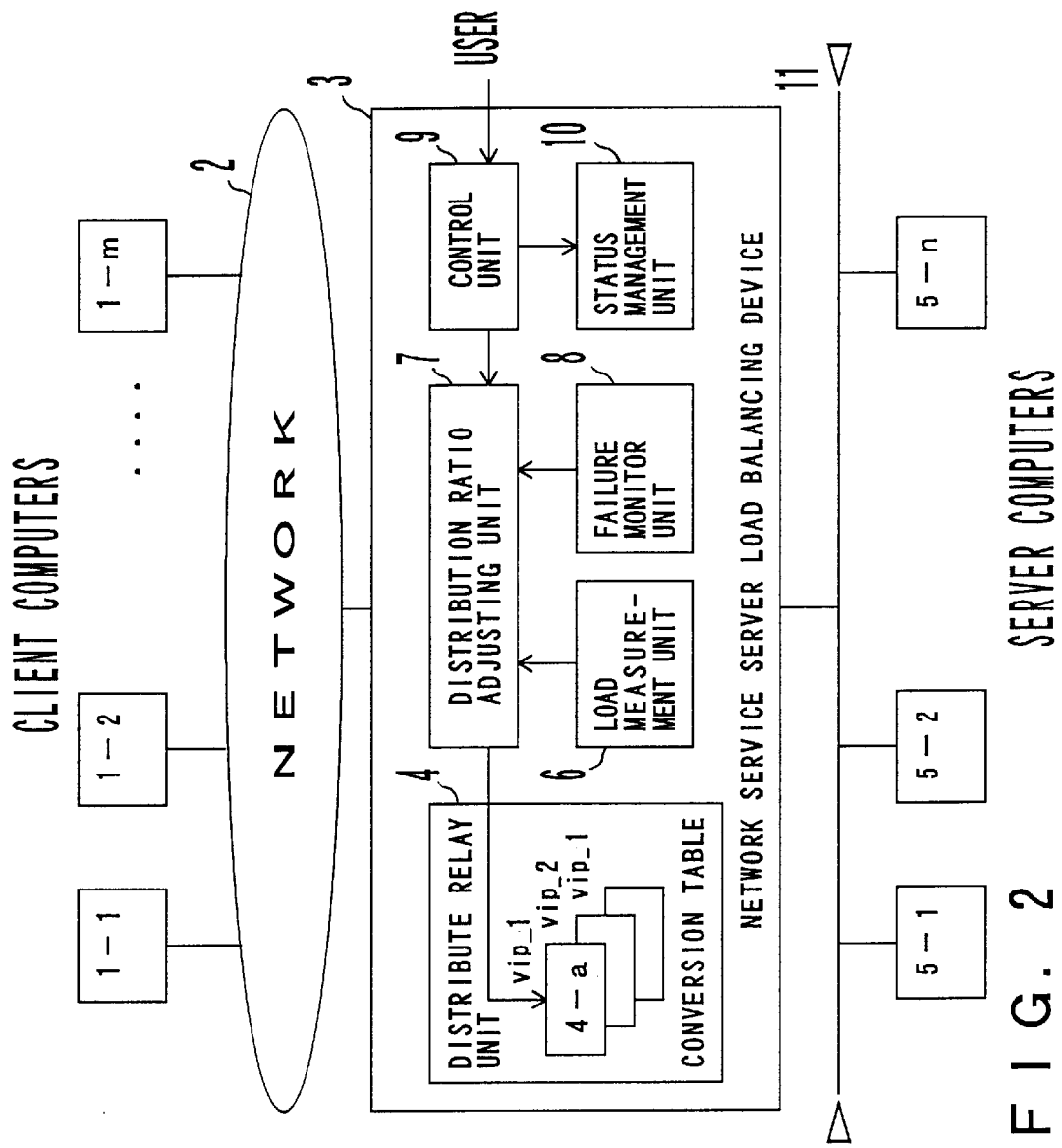
F I G. 2

|   | (*, *, 2 3)  |
|---|---|
| 0 | SERVER 5−1 |
| 1 | SERVER 5−2 |
| 2 | SERVER 5−3 |
| → 3 | SERVER 5−1 |
| 4 | SERVER 5−2 |
| 5 | SERVER 5−3 |
| 6 | SERVER 5−1 |
| 7 | SERVER 5−1 |

F I G. 6

NETWORK SERVICE SERVER LOAD BALANCING DEVICE, NETWORK SERVICE SERVER LOAD BALANCING METHOD AND COMPUTER-READABLE STORAGE MEDIUM RECORDED WITH NETWORK SERVICE SERVER LOAD BALANCING PROGRAM

BACKGROUND OF THE INVENTION

1. Field of the Invention

The present invention relates to the balancing of the service load on a network service server.

More specifically, the present invention relates to a network service server load balancing device, a network service server load balancing method, and a computer-readable storage medium recorded with a network service server load balancing program, which allow the network service load to be distributed dynamically and efficiently to each of multiple network service servers according to its status.

2. Description of the Related Art

In recent years, as network services have increased with the rapid spread of Internet/Intranet, the demand has increased for improving the performance of and permitting more efficient utilization of the client server system and increasing the stability of services of servers. In particular, there is a demand for an environment which permits centralized access to the WWW (World Wide Web) server to be circumvented and failures to be hidden. For this reason, a system has been provided which uses two or more servers (or nodes) to perform one service (for example, ftp (file transfer protocol), HTTP (Hyper Text Transfer Protocol), telnet, or the like).

In order to implement services with stability, it is required to distribute services to each server suitably. On the other hand, the network services have become increasingly diversified, complicated, and advanced, and the frequency at which changes are made to the configuration of a group of servers and the service distribution method has increased. Also, the demand has increased for circumventing stops of some services due to some servers going down unexpectedly. Existing techniques of distributing services to multiple servers include:

(a) Round-robin DNS (Domain Name Server): in the DNS service, an entry table is set up in which multiple server IP (Internet Protocol) addresses are mapped to one domain name. When an inquiry is made by a client about a server IP address, servers are allocated to the client on a round robin basis according the entry table and the IP addresses of the allocated servers are presented to the client, thereby distributing services to multiple servers.

(b) Load distribution hardware: a hardware device is placed between a server group and a network to relay communications between clients and servers. Load measuring communications are made between the hardware device and each server and packets to be relayed are monitored to measure the number of connections to each server and its response time, thereby detecting the load condition of each server and distributing services to the servers accordingly.

(c) Agent: a function, called Agent, which resides on each server in a server group measures the load on its CPU (Central Processing Unit) and its disk utilization to see its load condition. The load distribution system is notified of the load condition of each server and distributes services to the servers accordingly.

However, the conventional techniques have the following problems:

Round robin DNS: in this system, services are distributed to servers only equally or at simple rates and each server has to perform services allocated to itself irrespective of its capabilities and dynamic load conditions. This produces a difference in load condition between each server, resulting in reduced efficiency of the whole system. Further, in the event that a server has gone down and the configuration of the server group has to be modified accordingly, it is required to manually make such a change to the server group configuration to delete a server that went down from the entry table. This change is made each time a server goes down. It is therefore difficult to cope with such a situation immediately. As a result, the whole system will have to be stopped temporarily.

Load distribution hardware: this system uses hardware and hence include large introduction costs. The employment of this system is limited because the hardware will not be incorporated into each server. In addition, since communications for load measurement are always needed between each server, extra load, which is different from original communications, is imposed on each server, which further increases traffic and may cause servers to go down. Furthermore, since the load is measured on a packet-by-packet basis, the servers may be switched even in mid-service and consequently errors may occur. Agent: since the agent function resides on each server, the server has to be modified at the time the function is installed and moreover the agent must conform to the server's operating system (OS). In addition, the load measurement is always made for each server, resulting in a further increase in the load on the server. Furthermore, as is the case with the load distribution system, since the load is measured on a packet-by-packet basis, the servers may be switched even in mid-service and consequently errors may occur.

SUMMARY OF THE INVENTION

It is therefore an object of the present invention to provide a network service server load balancing device, a network service server load balancing method, and a computer-readable recording medium recorded with a network service server load balancing program, which permit changes in the server group configuration and server statuses to be accommodated instantly, permit the changes to be reflected on a client instantly, require no modification of the servers at installation time, and permit various forms of employment to be accommodated flexibly.

A network service server load measurement device of the present invention comprises a conversion information storage unit, a distributive relay unit, a distribution ratio adjusting unit, a load measuring unit, a first control unit, second control units, a third control unit, a storage unit, and an adjustment unit.

According to a first aspect of the present invention, the conversion information storage units store conversion information representing a correspondence relationship of the first control unit to the second control units. The distributive relay unit transfers data sent by the first control unit to one or more of the second control units on the basis of the conversion information stored in the conversion information storage unit. The distribution ratio adjusting unit adjusts the correspondence relationship in the conversion information stored in the conversion information storage unit. The load measuring unit measures loads on the second control units and notifies the distribution ratio adjusting unit of load conditions of the second control units to thereby allow the distribution ratio adjusting unit to adjust the correspondence relationship in the conversion information stored in the conversion information storage unit.

According to a second aspect of the present invention, the first control unit sends data. The second control units receive the data. The third control unit transfers the data sent by the first control unit to the second control units. The conversion information storage unit stores conversion information which represents a correspondence relationship of the first control unit to the second control units. The distributive relay unit transfers the data sent by the first control unit to one or more of the second control units according to the correspondence relationship in the conversion information stored in the conversion information storage unit. The distribution ratio adjusting unit adjusts the correspondence relationship in the conversion information stored in the conversion information storage unit. The load measuring unit measures the load on each of the second control units and notifies the distribution ratio adjusting unit of load conditions of the second control units in order to allow the distribution ratio adjusting unit to adjust the correspondence relationship in the conversion information stored in the conversion information storage unit.

According to a third aspect of the present invention, the conversion information storage unit stores conversion information which represents a correspondence relationship of the first control unit to the second control units. The distributive relay unit transfers the data sent by the first control unit to one or more of the second control units according to the correspondence relationship in the conversion information stored in the conversion information storage unit. The distribution ratio adjusting unit adjusts the correspondence relationship in the conversion information stored in the conversion information storage unit. The load measuring unit measures the load on each of the second control units and notifies the distribution ratio adjusting unit of load conditions of the second control units in order to allow the distribution ratio adjusting unit to adjust the correspondence relationship in the conversion information stored in the conversion information storage unit.

According to a fourth embodiment of the present invention, the conversion information storage unit stores conversion information which represents a correspondence relationship of the first control unit to the second control units. The distributive relay unit transfers the data sent by the first control unit to one or more of the second control units according to the correspondence relationship in the conversion information stored in the conversion information storage unit.

According to a fifth aspect of the present invention, the storage unit stores relevant data so that it will be processed in a corresponding server. The balancing unit decides whether each server is over loaded and, if it is, balances the load on that server so that it will be distributed to the other servers.

BRIEF DESCRIPTION OF THE DRAWINGS

The present invention will be more apparent from the following detailed description, when taken in conjunction with the accompanying drawings, in which:

FIG. 1 is a schematic representation of the present invention;

FIG. 2 is a block diagram of a system configuration of the present invention;

FIG. 6 shows an example of a pattern hash table;

DETAILED DESCRIPTION OF THE PREFERRED EMBODIMENTS

Figures 3A, 3B:
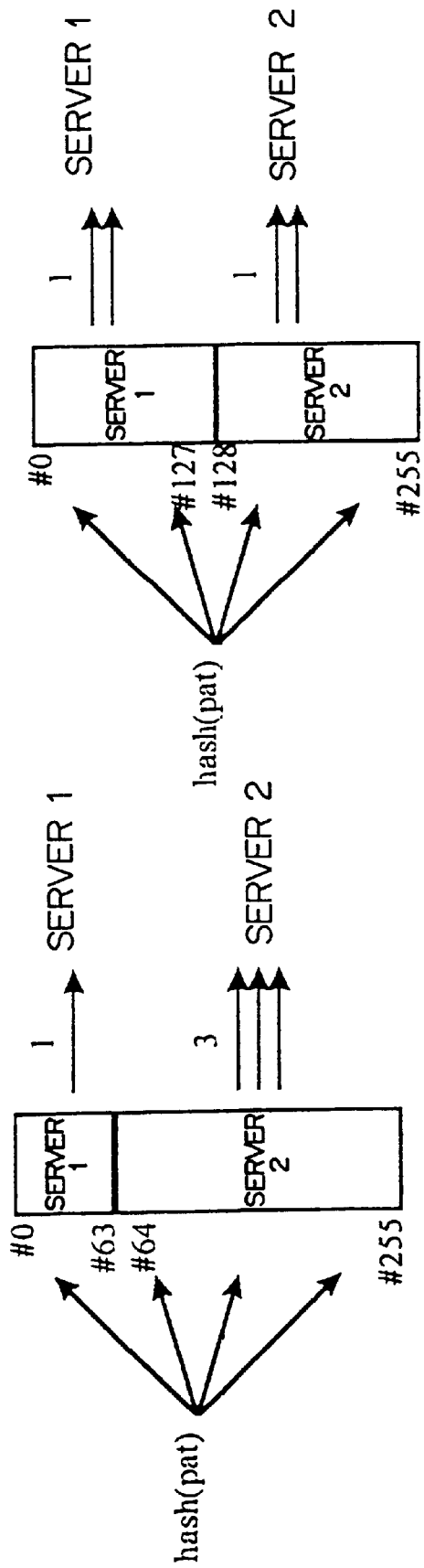
FIG. 3A shows an example of hash function-based distribution of services to servers.
FIG. 3B shows another example of hash function-based distribution of services to servers.

FIG. 1 is a conceptual diagram of the present invention.

The inventive device has a group address, vip, that represents multiple servers, and a client sends packets to vip. Packet transfer is made by changing the destination of the packets from the vip to the server's address. The main operation of packet transfer includes receiving a packet, masking its header to obtain a pattern (mask(head)→pat), converting the pattern, pat, into an index in a conversion table using a hash function (hash(pat)→ix), changing the destination of the packet from vip to ip where ip is a destination address corresponding to the address of a server that a slot, ix, in the conversion table has, and sending the packet to that server. For load measurement, the connection time is measured through processing of sending packets to the server. A total quantity of connection time is computed from the start of the measurement (the previous measured values are reset), and the number of connections is incremented.

The network service server load balancing device of the present invention distributes packets from a client to servers in accordance with the contents of the conversion table. The conversion table is updated so that the distribution ratio of packets to each server will be converged dynamically to the optimum one according to the load and failure conditions of the respective servers.

FIG. 2 is a block diagram of a system configuration of the present invention.

A first embodiment of the present invention is directed to a network load balancing device which, for use with a system in which data is transferred from a first control unit to a plurality of second control units over a network, comprises a conversion information storage unit which stores conversion information that represents a correspondence relationship of the first control unit to the second control units, a distributive relay unit which transfers data from the first control unit to one or more of the second control units on the basis of the correspondence relationship stored in the conversion information storage unit, a distribution ratio adjusting unit which adjusts the correspondence relationship information stored in the conversion information storage unit, and a load measurement unit which measures the load conditions of the respective second control units and notifies the distribution ratio adjusting unit of the measured load conditions to allow the balancing unit to balance the correspondence relationship of the first control unit to the second control units.

In FIG. 2, reference numerals 1-1, 1-2, . . . , 1-*m* denote client computers available to users, which receive services from server computers 5-1, 5-2, . . . , 5-*n* over a network 2 and a network service server load balancing device 3. The network 2 is the Internet, an intranet, a local area network (LAN), or a wide area network (WAN). Reference numeral 11 denotes a network which is made up by a group of the server computers 5-1, 5-2, . . . , 5-*n*. Reference numeral 3 denotes a network service server load balancing device which is composed of a distributive relay unit 4, a conversion table 4-*a*, a load measurement unit 6, a distribution ratio adjusting unit 7, a failure monitor unit 8, a control unit 9, and a status management unit 10. The balancing unit 3 has virtual addresses vip__1, vip__2, . . . , vip__l and, when a client makes access to the address vip__i (1≦i≦1), allows the servers 5-1, 5-2, . . . , 5-*n* to look like a single computer having the address vip__i. The distributive relay unit 4 relays communications between the clients 1-1, 1-2, . . . , 1-*m* and the servers 5-1, 5-2, . . . , 5-*n*. More specifically, the relay unit receives a packet having the destination address vip__i from one of the clients, masks its header (containing the IP address of the client itself, a port number representing the type of service such as ftp, HTTP, telnet, or the like, the IP address of the destination server, etc.) to obtain a pattern, identifies structured data having the same pattern in the conversion table 4-*a* for vip__i by means of pattern matching, converts the pattern to an index to identify a slot, determines a server to which the packet is to be directed from server information that slot holds, and sends the packet to the server thus determined. The details of the conversion table 4-*a* will be described later. The load measurement unit 6 measures the load on each of the servers. More specifically, the load measuring unit monitors packets which the distributive relay unit relays, measures the load conditions, such as the average connection time and the number of connections per unit time, for each of the servers, and presents the measurements to the distribution ratio adjusting unit 7 at regular intervals. The balancing unit detects the stop of a server depending on whether its measurement indicates an abnormal value and detects over loaded servers using a reference value. In response to stopped-server notification from the failure monitor unit 8 or an instruction from the control unit 9, the balancing unit recomputes the service distribution ratio when over-doped servers or stopped servers are detected or as instructed by the user and updates the conversion table 4-*a* accordingly. The failure monitor unit 8 performs a polling command, such as ping, on each server at regular intervals and considers servers that caused a certain number of time-outs to be in the stopped state. This information is presented to the distribution ratio adjusting unit 7. The control unit 9 controls the network service server load balancing unit 3 in its entirety as instructed by the user. More specifically, the control unit starts or stops the load measurement unit 6, the distribution ratio adjusting unit 7, and the failure monitor unit 8 and retains and restores the information set in the conversion table 4-*a*. The status management unit 10 retains information set in the conversion table 4-*a* and the network service server balancing unit 3 in a file and restores it. More specifically, the status management unit retains information set in the conversion table 4-*a* and the network service server load balancing unit 3 in a file when the distribution ratio adjusting unit is stopped and additions are made to servers and services or when a command is given by the user. When the distribution ratio adjusting unit is started and the servers or services are restored or when a command is given by the user, the status management unit restores the information, provided that the server group configuration is the same as before the distribution ratio adjusting unit is stopped or before the servers or services are stopped.

Since the load conditions of the servers that make up a network are measured and packets from clients are sent to the servers according to the load conditions of each client, well-balanced, efficient services can be provided. Moreover, since it is known which server a sequence of packets is being sent to, no server switching occurs in the middle of a sequence of services. Furthermore, since there is no need of flowing data dedicated to load balancing on communication paths, the paths can be employed for services only.

How to distribute packets sent by the clients to the servers in the above arrangement and how to converge the distribution ratio of the packets to the servers dynamically to the optimum state will be described separately.

A second embodiment of the present invention is directed to a network load balancing device characterized in that the load measuring unit measures the load on the basis of the average time of connecting data to each second control unit and the number of connections of data to the second control unit per unit time.

First, how to distribute packets sent by clients to the servers will be described.

As shown in FIGS. 3A and 3B, if a hash function can distribute indexes uniformly, then the service distribution ratio to the servers becomes equal to the ratio of the numbers of slots assigned to the servers in the conversion table.

As an example, if, as shown in FIG. 3A, the conversion table has 256 slots (numbered 0 to 255), and server 1 and server 2 are assigned 64 slots and 192 slots, respectively (consecutive slots need not necessarily be assigned to each server), then services will be distributed to server 1 and server 2 at a ratio of 1:3. Thus, the service distribution ratio can be changed by changing the number of slots assigned to each server. If, as shown in FIG. 3B, 64 slots of 192 slots assigned to server 2 are assigned to server 1, then the ratio of the number of slots assigned to server 2 to that assigned to server 2 will become one to one (1:1) and the service distribution ratio will also become one to one (1:1).

Figure 4:
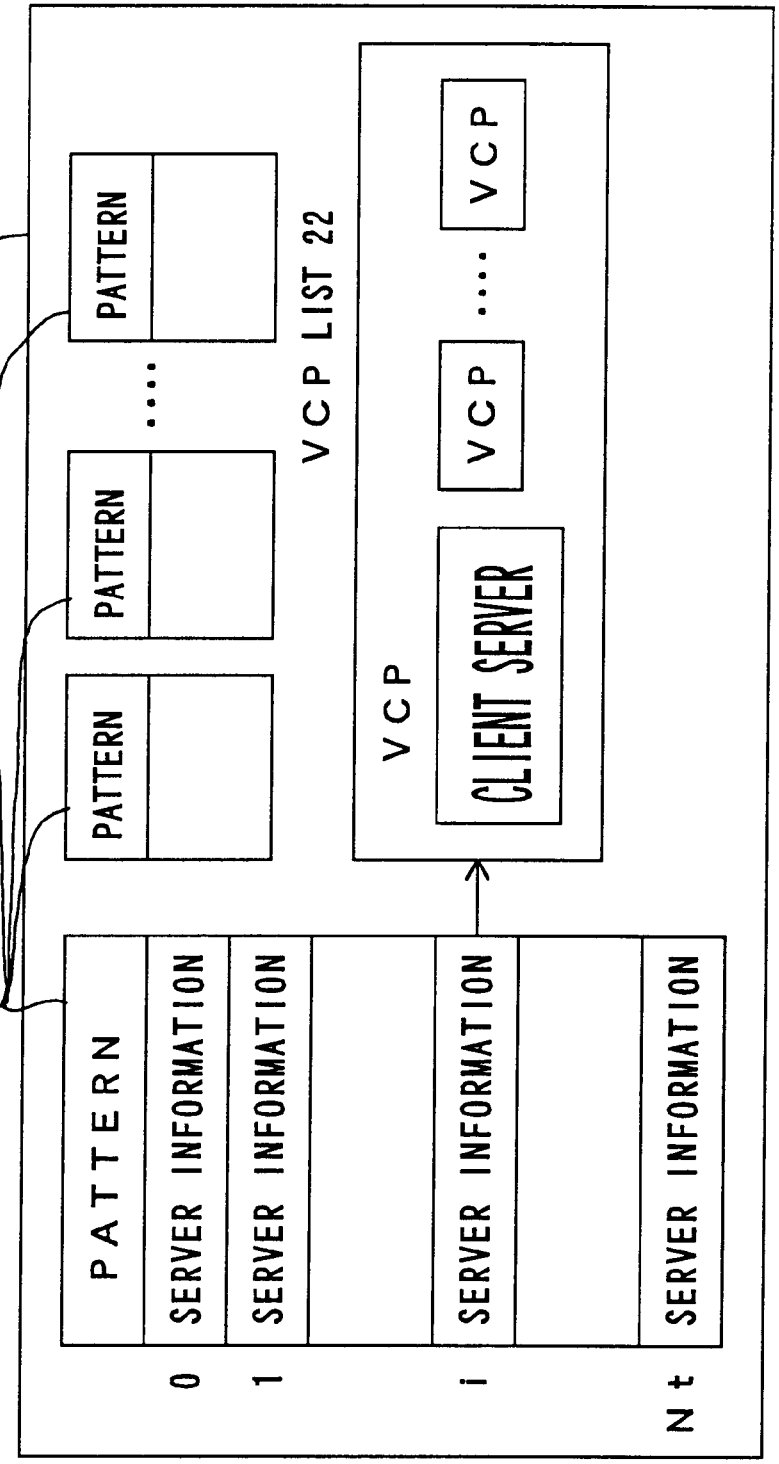
FIG. 4 shows an arrangement of the conversion table shown in FIG. 2.

FIG. 4 shows an arrangement of the conversion table.

The conversion table 4-a is one referred to as a pattern hash table 21 that is structured data composed of one or more slots each accessible by an index obtained by applying a hash function to a pattern obtained by masking a packet header. Data additions or deletions can be made to or from the conversion table at the time of system operation. Each slot contains information which can identify one of the servers 5-1, 5-2, . . . , 5-n and a VCP (Virtual Circuit Preservation) list 22 which holds client-server information in a service being relayed through that slot. Since the service distribution ratio can be controlled by the ratio of numbers of slots assigned, it follows that the more slots a server is assigned, the more services it will be assigned.

Figure 5:
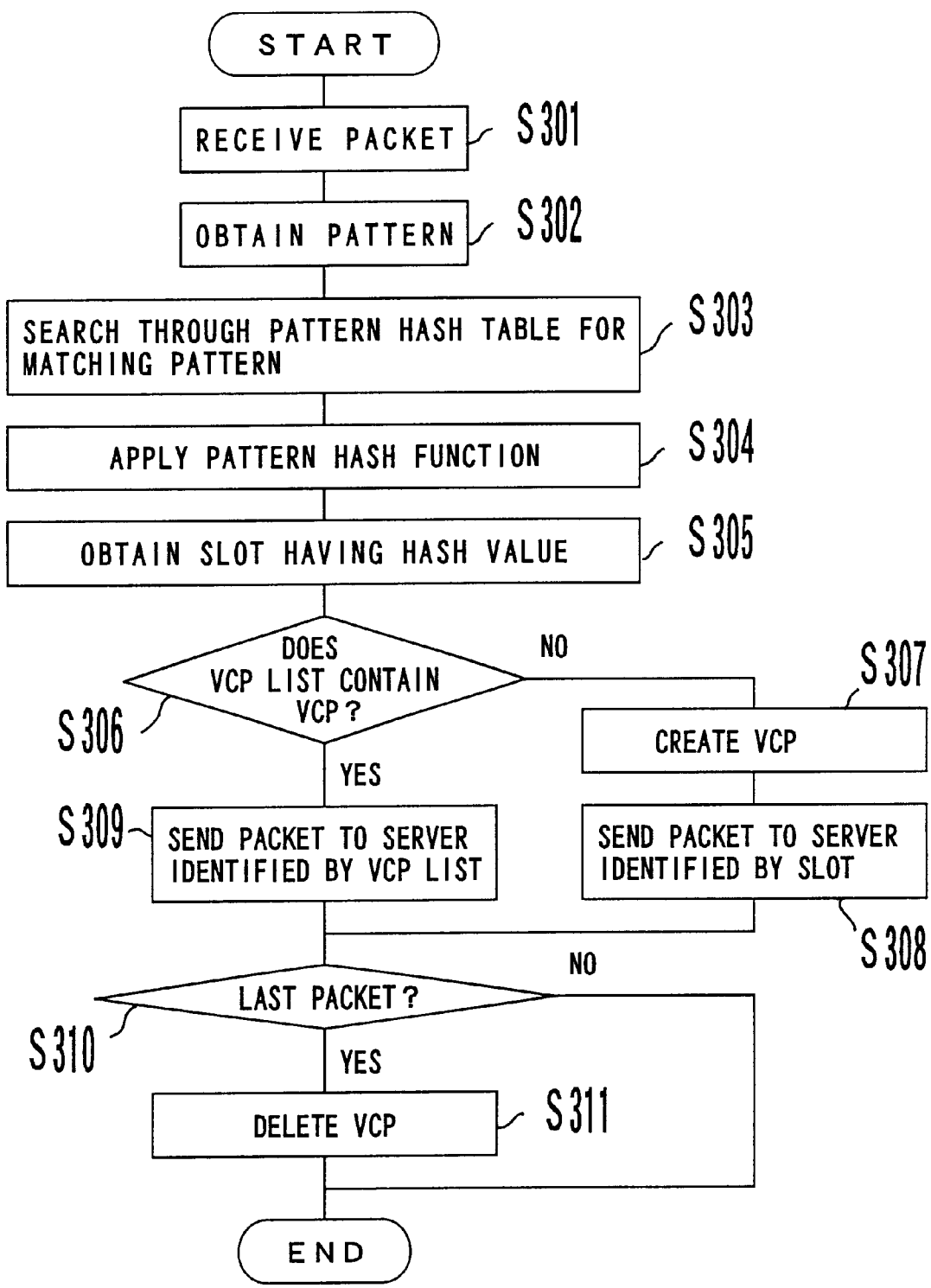
FIG. 5 is a flowchart illustrating to which server a packet is transferred.
Figure 7:
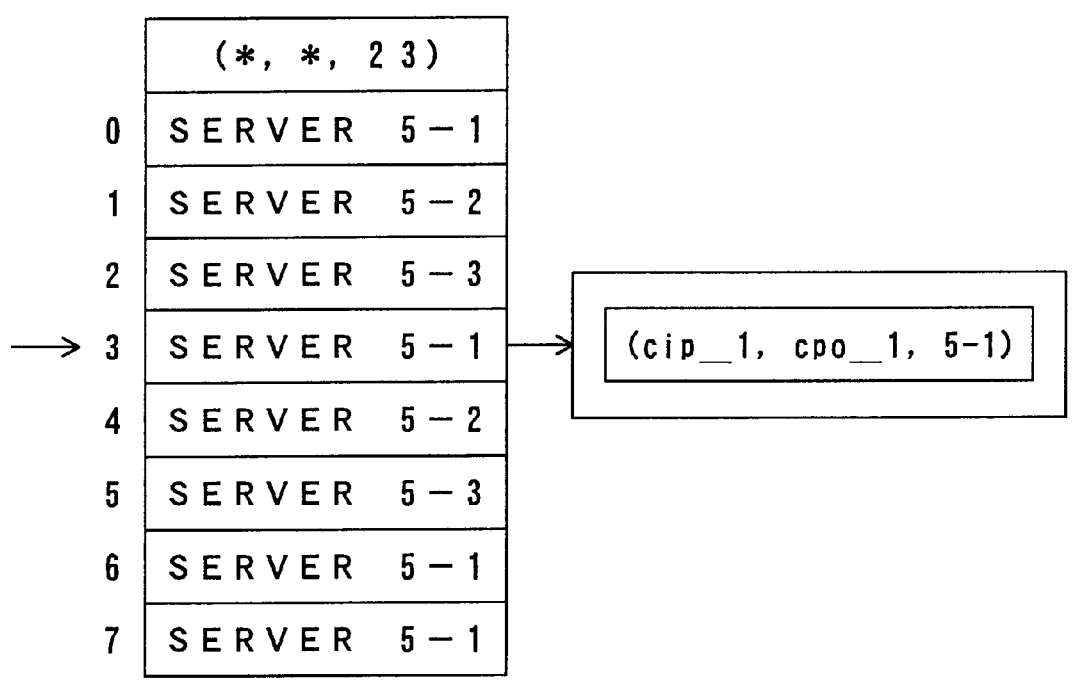
FIG. 7 is a diagram for use in explanation of the use of the pattern hash table having a VCP list.
Figure 8:
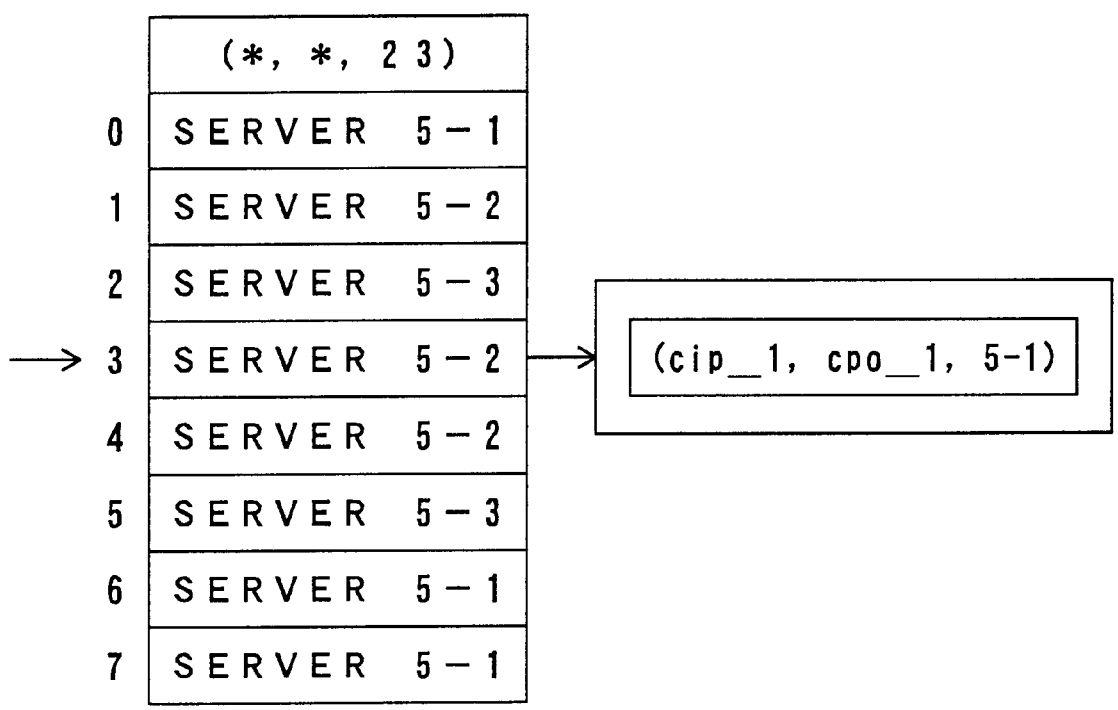
FIG. 8 is a diagram for use in explanation of the use of the pattern hash table having a VCP list.
Figure 9:
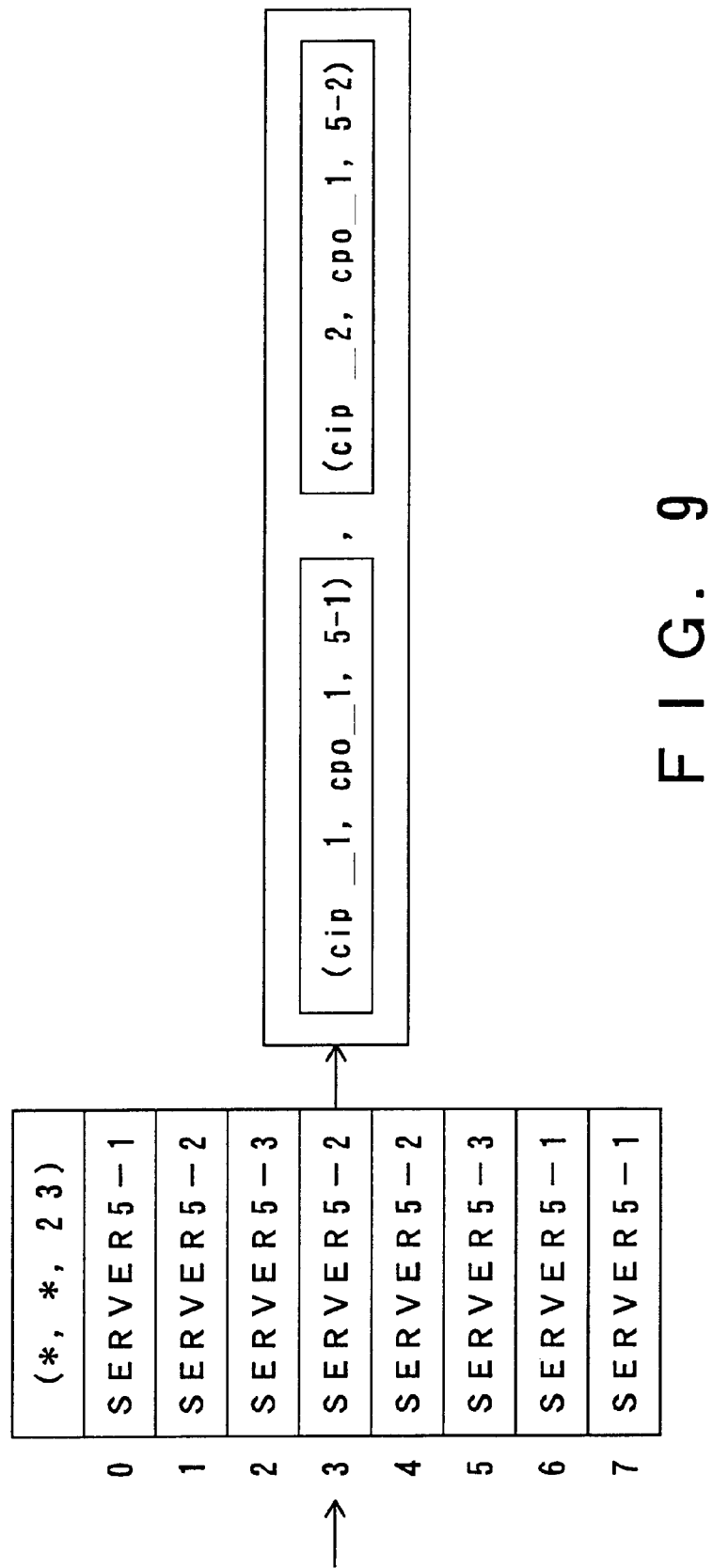
FIG. 9 is a diagram for use in explanation of the use of the pattern hash table having a VCP list.
Figure 10:
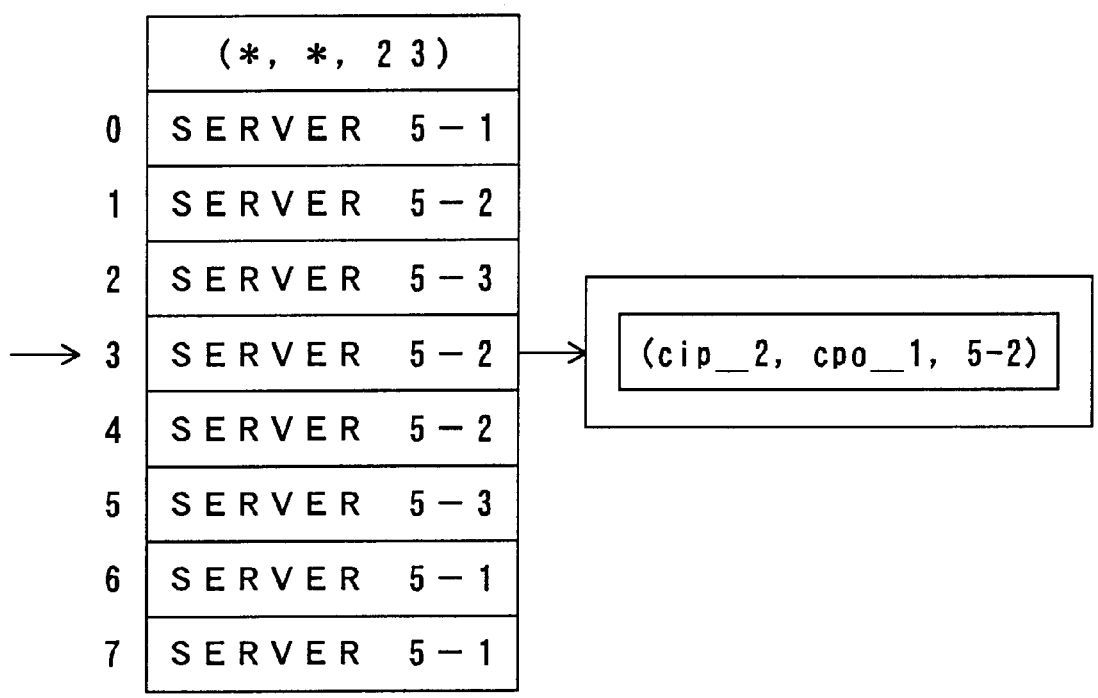
FIG. 10 is a diagram for use in explanation of the use of the pattern hash table having a VCP list.

FIG. 5 is a flowchart illustrating which server a packet is transferred to. First, in step S301, the network service server load balancing unit 3 receives a packet sent from a client. In step S302, the distributive relay unit 4 obtains a pattern of the header of the received packet. The pattern of the header is a set of bit streams obtained by masking the packet header and takes the form of, for example, (cip_1, cpo_1, 23). Here, cip_1 is the client IP address, cpo_1 is the client port number, and 23 is the service port number. In step S303, the distributive relay unit 4 searches through the pattern hash table in the conversion table 4-a for a pattern that matches the pattern (cip_1, cpo_1, 23). For example, such a pattern (*, *, 23) as shown in FIG. 6 is obtained. This pattern matches a pattern of an arbitrary IP address, an arbitrary port number, and the service port number 23. Next, in step S304, a hash function is applied to the pattern obtained in step S302. In step S305, the solution is obtained. For the hash function, the remainder of the division by 8 is set as the solution. It is assumed here that the solution [3] was obtained. This means that slot 3 was selected in FIG. 6. In slot 3, server 5-1 is set as server information.

Next, in step S306, a decision is made as to whether the received packet is the first one of a sequence of packets. A sequence of packets is packets in which a client having the same client IP address cip_1 requests the same client port cpo_1a for a service of the same service port number 23. Whether the received packet is the first one of a sequence of packets depends on whether the VCP list of slot 3 contains VCP (cip_1, cpo_1, 5-1). If that packet is the first one, the VCP list 22 does not contain VCP (cip_1, cpo_1, 5-1). In step S307, therefore, VCP (cip_1, cpo_1, 5-1) is created in the VCP list 22. In step S308, the created packet is sent to the server 5-1. If, in step S306, the VCP list contains VCP (cip_1, cpo_1, 5-1), that is, if packets in which a client having the same client IP address cip_1 requests the same client port cpo_1 for a service of the same service port number 23 are being transferred, that packet is transferred to the server 5-1 identified by VCP (cip_1, cpo_1, 5-1) in the VCP list 22.

Next, in step S310, a decision is made as to whether this packet is the last one. If it is, VCP (cip_1, cpo_1, 5-1) is deleted from the VCP list 22.

Reference will be made to FIGS. 5 through 10 to describe how four packets will be transferred to a server in a state where no packet is received. To simplify the description, it is assumed that these packets contain the same client IP address cip_1, the same client port cpo_1, and the same service port number 23. Steps S301 to S305 in FIG. 5 are assumed to be the same for all the packets. That is, it is assumed that the pattern in the pattern hash table that matches the packet pattern is (*, *, 23) and the hash value of the packet pattern is 3, i.e., the slot number is 3.

First, packet 1 (cip_1, cpo_1, 23) is sent by the client 1-1. Since the VCP list contains nothing (S306, FIG. 6), VCP (cip_1, cpo_1, 5-1) is created (S307, FIG. 7), and packet 1 is transferred to the server 5-1 (S308) identified in slot 3. After that, the server information in slot 3 is assumed to have been updated from 5-1 to 5-2 by the distribution ratio adjusting unit 7. This updating will be described later. Next, packet 2 (cip_1, cpo_1, 23) is sent by the client 1-1 that sent packet 1. Packet 2 is transferred to the server 5-1 (S309) since the VCP list contains VCP (cip_1, cpo_1, 5-1) though the server information in slot 3 has been updated to server 5-2 (S306, FIG. 8). That packet 2 is transferred to the server 5-1 as opposed to the server 5-2 means that the interruption of the service being processed is prevented. Next, packet 3 (cip_2, cpo_2, 23) is sent by the client 1-2. The VCP list contains no VCP information about the client 1-2 (S306, FIG. 8). Thus, VCP (cip_2, cpo_2, 5-2) is added to the VCP list (S307, FIG. 9) and packet 3 is then transferred to the server 5-2 specified in the slot 3 (S308). Finally, packet 4 (cip_1, cpo_1, 23) is sent by the client 1-1. This packet 4 is assumed to be the last one. Since the VCP list contains VCP (cip_1, cpo_1, 5-1) (S306, FIG. 9), packet 4 is transferred to the server 5-1 (S309). Since this packet is the last one (S310), VCP (cip_1, cpo_1, 5-1) is deleted from the VCP list (S311, FIG. 10).

As described above, VCP information is added to the slot VCP list at the commencement of service and maintained until the service is terminated. At the time of access to a slot, the VCP list the slot has is examined. If an incoming packet is one for a service in process, then it will be delivered to a server already specified in the VCP list. Therefore, it becomes possible to prevent an interruption of the service in process even when a change is made to server information that a slot holds at the service distribution ratio control time.

The more slots the server is assigned, the more services it is assigned. Thus, the service distribution ratio can be controlled by the ratio of the numbers of slots assigned to the servers. When a server is over loaded, the average connection time becomes long and the number of connections decreases, which is employed as the criterion for judging whether a server is over loaded. It therefore becomes possible to circumvent a misjudgment of over loading as made when the number of connections to a server increases temporarily or connection itself is little made to it.

A third embodiment of the present invention is directed to a network load balancing device which is characterized in that the distribution ratio adjusting unit judges the level of the load on each second control unit on the basis of the average time of connection of data to it and the number of connections of data to it and balances the load on each second control unit by adjusting the ratio of distribution of data to the second control units.

How to converge the distribution ratio to the servers dynamically to the optimum value, in other words, how to change the conversion table 4-a so that the distribution ratio to the servers will be converged dynamically to the optimum value according to the load conditions and the failure conditions of the servers will be described below.

Figure 11:
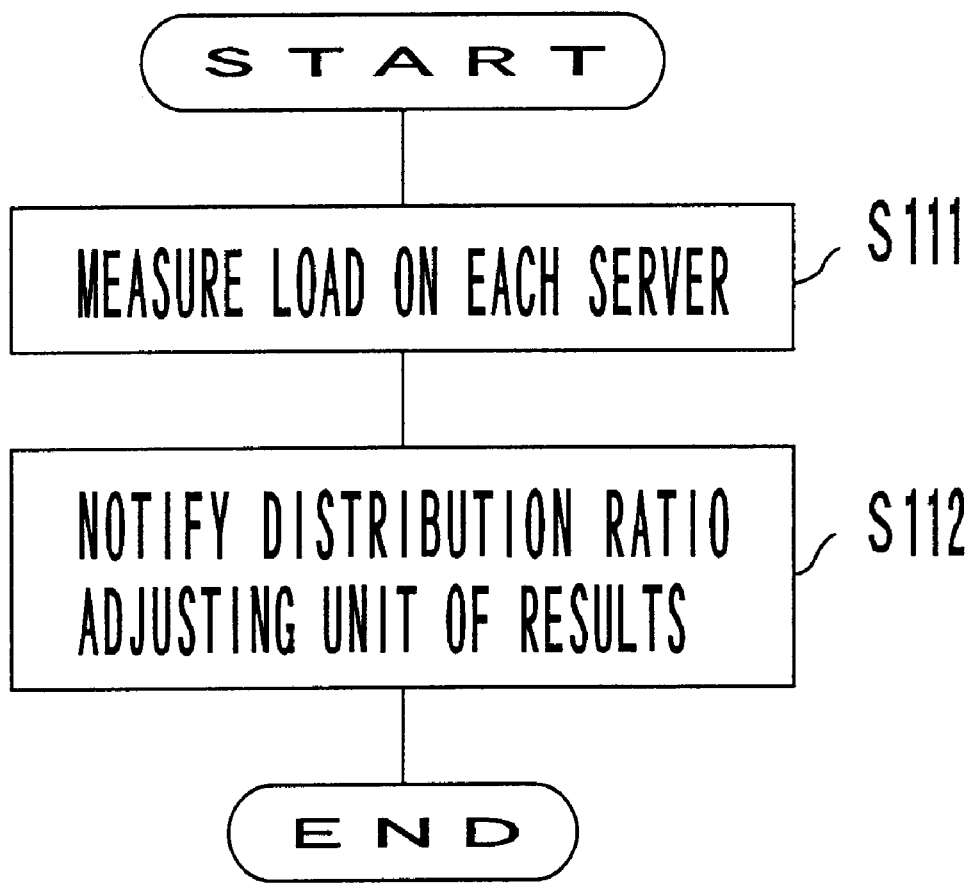
FIG. 11 is a flowchart for load measurement.

FIG. 11 is a flowchart for measurement of the load on each server.

In step S111, the load measurement unit 6 measures the load on each of the servers. The load measurement is made based on measured values at the packet transmission time. Thus, since there is no need for communications and server's processing (load measurement and notification), the inventive device can be installed and operated without affecting the servers. For load measurement, the following set of operations is repeated. That is, the set of operations comprises resetting the previous measurements, waiting for n seconds, acquiring measurements (the total of connection time and the number of connections), and notifying the distribution ratio adjusting unit 7 of the measurements acquired. As the load on each server, use is made of the connection average time and the number of connections per unit time, which are obtained from the measured time interval between the moment that a connect request signal is sent to the server and the moment that a connect completion signal is received from the server prior to the transmission of packet data.

In step S112, the load measurement unit 6 notifies the distribution ratio adjusting unit 7 of those results.

Figure 12:
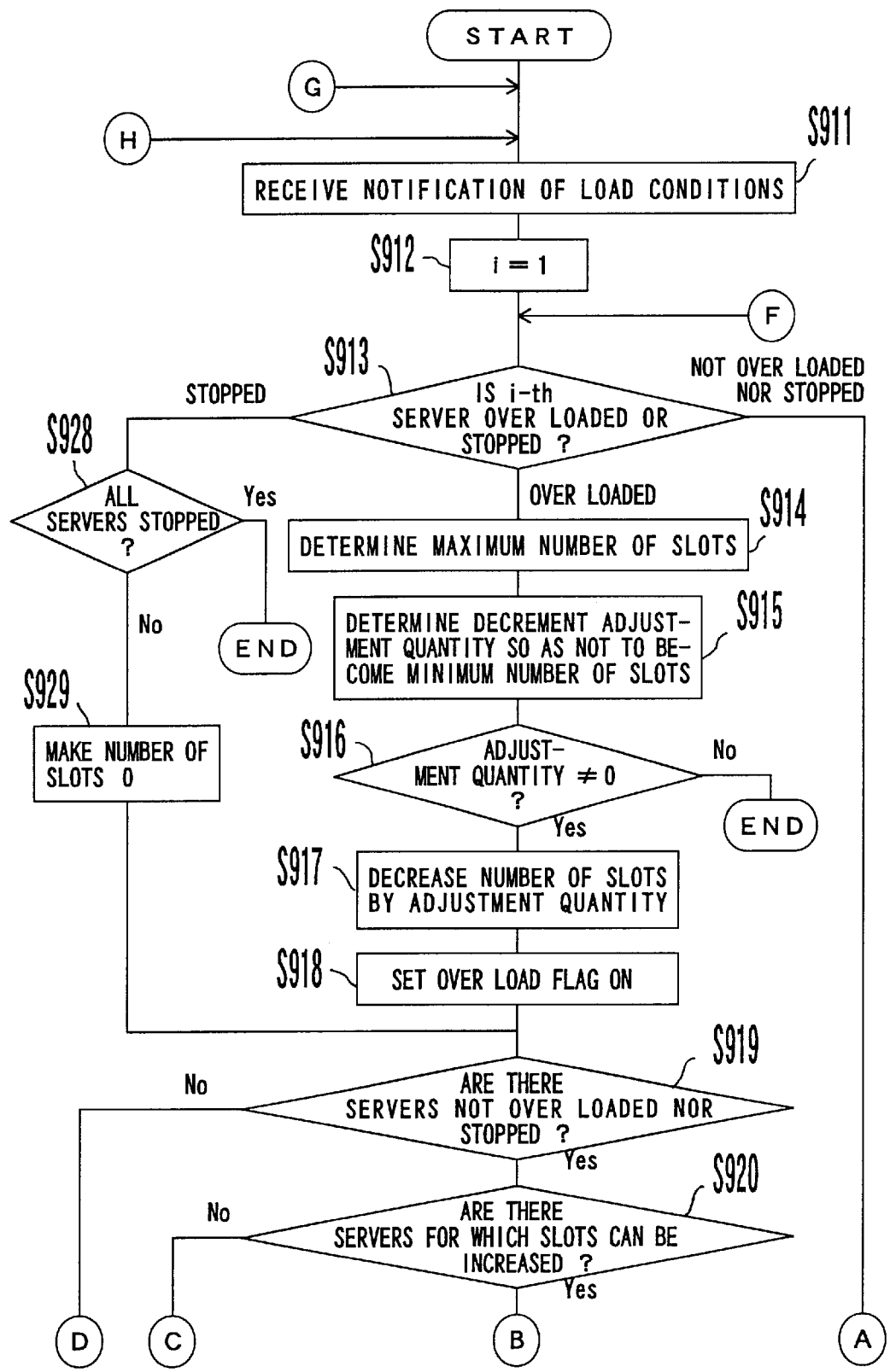
FIGS. 12 and 13 are a flowchart for load balancing.
Figure 13:
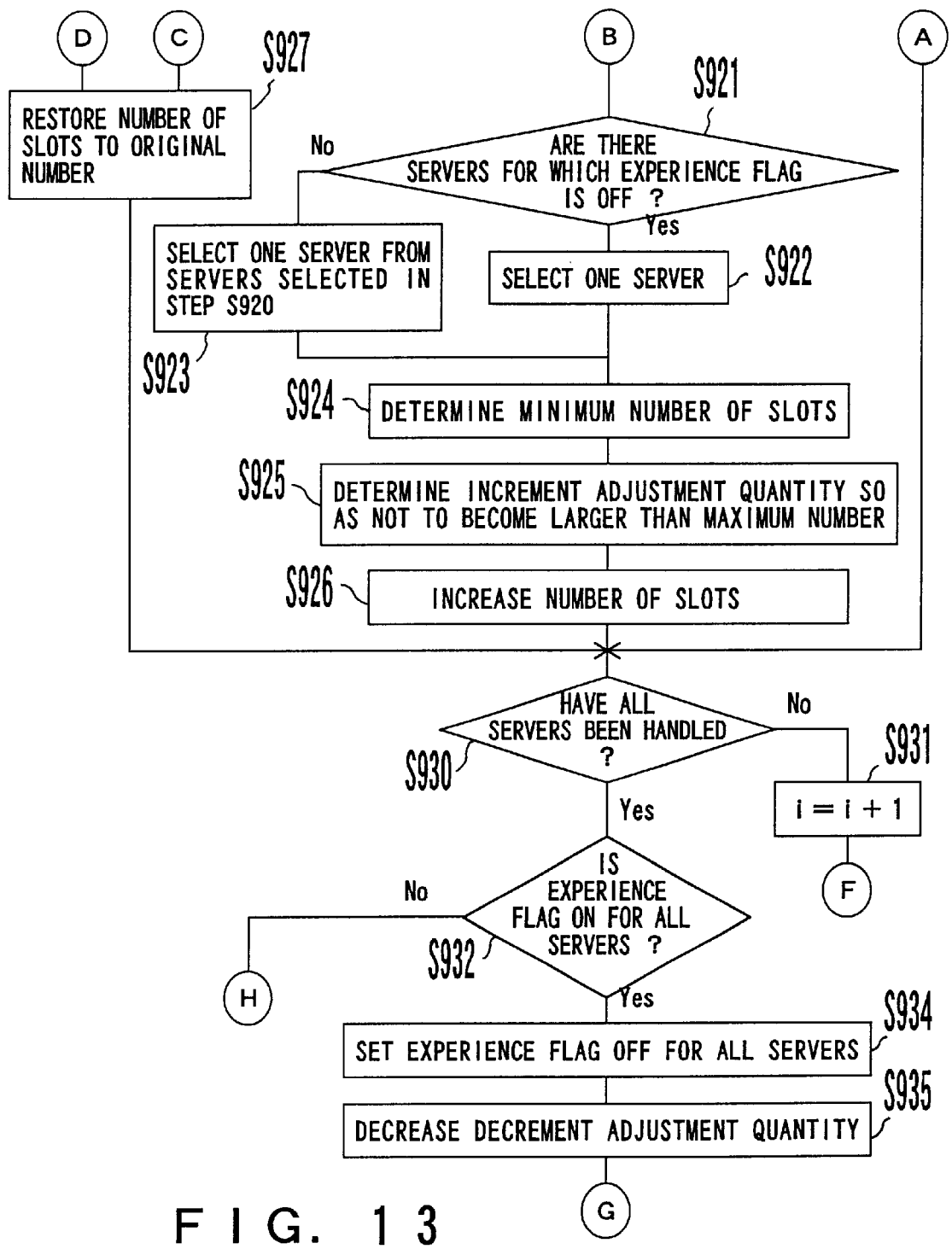

FIGS. 12 and 13 are a flowchart for load balancing.

In step S911, the distribution ratio adjusting unit 7 receives notification of load conditions from the load measurement unit 6 and then performs load balancing described below.

In step S912, the initial value of a variable i is set to 1 in order to perform load balancing starting with the first server. In step S913, a decision is made as to whether the first server is over loaded or stopped. In the example of the above-described load measurement, a server for which the connection average time per unit time is longer than a reference connection average time and the number of connections per unit time is less than a reference number of connections is considered to be under over load (FIGS. 15A and 15B), which is illustrated in a flowchart of FIG. 14.

Figure 14:
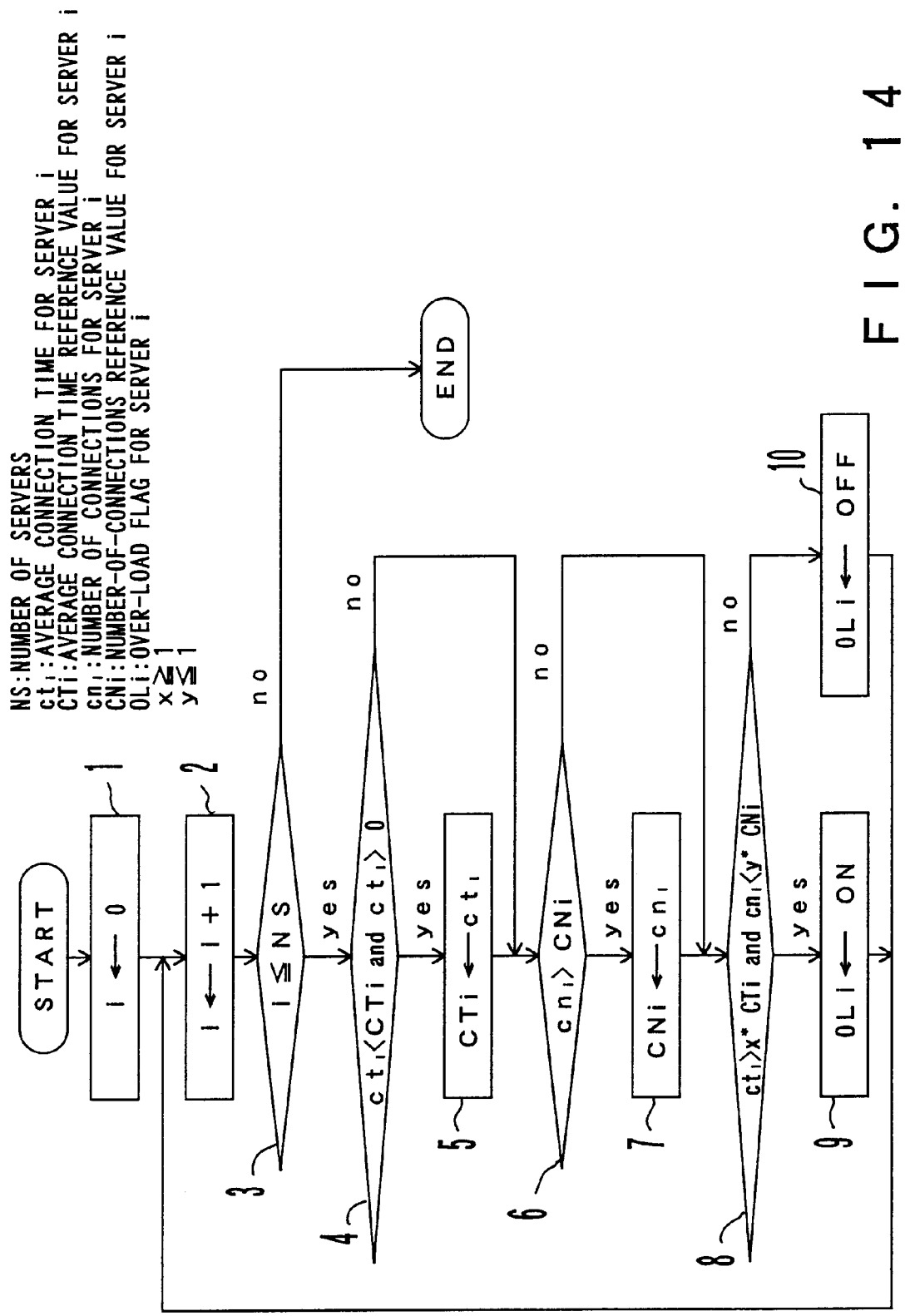
FIG. 14 is a flowchart for judgment of over load.
Figures 15A, 15B:
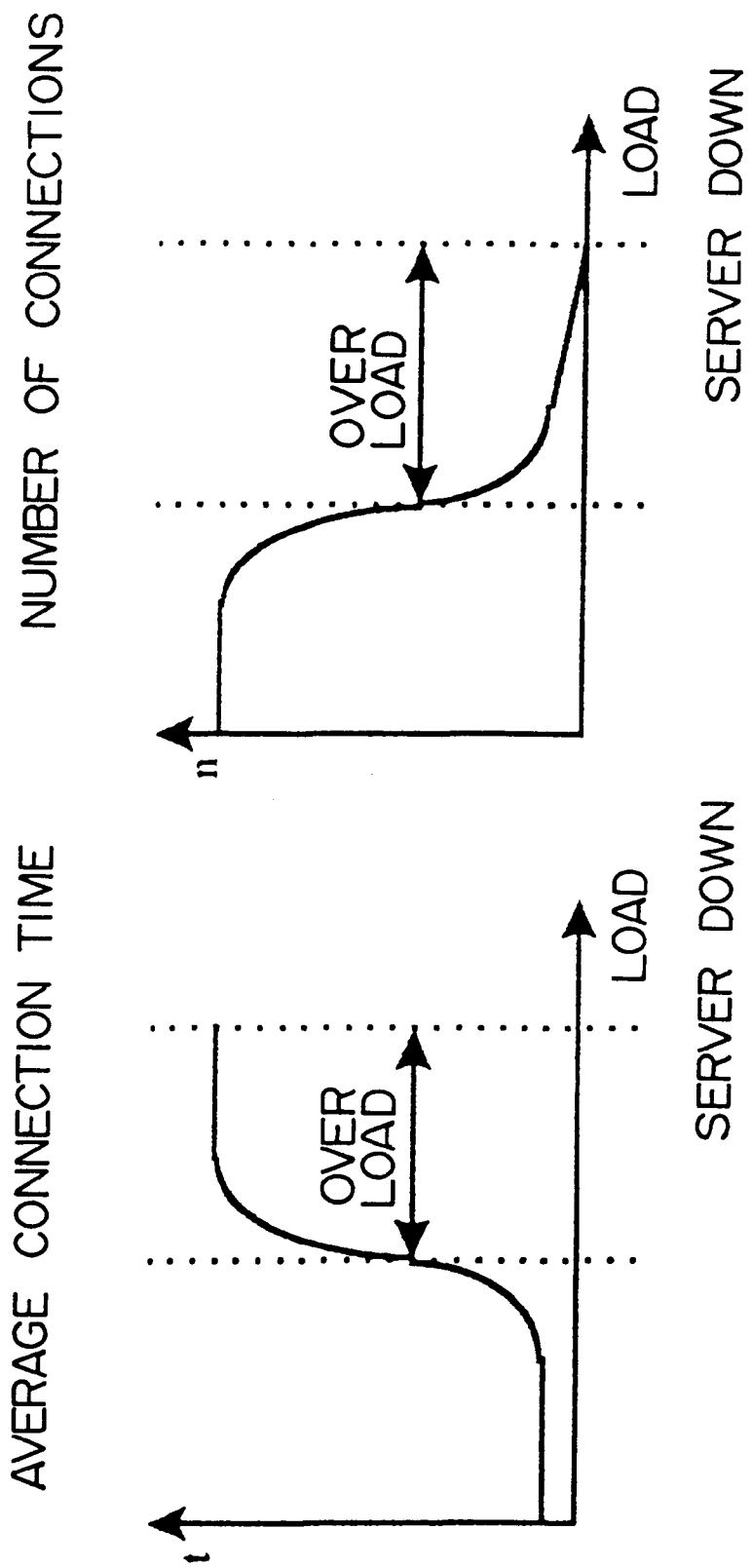
FIG. 15A is a diagram for use in explanation of over-load judgment based on the average connection time.
FIG. 15B is a diagram for use in explanation of over-load judgment based on the number of connections.

In FIG. 14, NS is the number of servers, cti is the connection average time for server i, CTi is the reference connection average time for server i, cni is the number of connections for server i, CNi is the reference number of connections for server i, and OLi is the over load flag for server i which is set ON when it is over loaded. FIG. 15A shows a connection average time versus load characteristic of a server, which illustrates that the connection average time increases because the connection time contains a long time-out period due to connection failures when connection processing cannot overtake connection requests because of over load conditions and thus the number of connection failures increases. The connection average time is obtained from the total connection time and the connection time. FIG. 15 shows a number of connections versus load characteristic, which illustrates that the number of connections per unit time decreases as the connection time becomes longer. The over load judgment is made on the basis of the two above-described features which can be observed when a server enters the over load state. The reason why two indexes of the connection average time and the number of connections are used is to prevent misjudgment based on the following two points. The first point is that, since the number of connect requests the servers can accept simultaneously is limited, when more connect requests than the server can accept occurs, the connection average time becomes long even if the servers are not in the over load state. This means that the number of connections the severs can accept simultaneously is a bottleneck. The number of connections becomes a maximum value or so. The other point is that, when the number of service requests (connect requests) to servers reduces, the number of connections also reduces proportionally. That is, the load on the servers decreases because of a small number of requests. Therefore, the use of both the connection average time and the number of connections permits the load judgment to be made correctly.

The connection average time reference value and the number-of-connections reference value used here are assumed to be the minimum connection average time per unit time and the maximum number of connections per unit time, respectively, which have been obtained so far. This is based on the fact that for a server which is in the over load state the connection average time increases and the number of connections decreases. By the use of both the connection average time and the number of connections for load judgment, it becomes possible to circumvent misjudgment that might occur if the number of connections to servers exceeded temporarily the number the servers can accept simultaneously or the number of connect requests by clients decreased.

Figure 16:
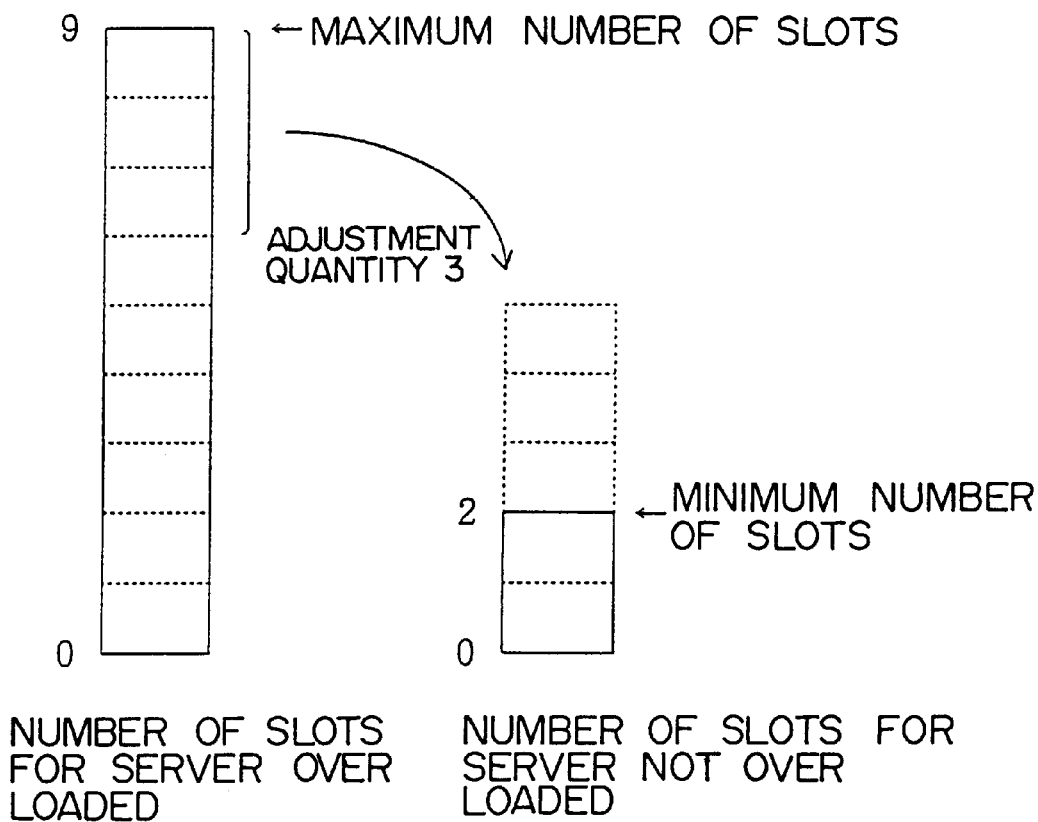
FIG. 16 is a diagram for use in explanation of a variation in the number of slots.
Figure 17:
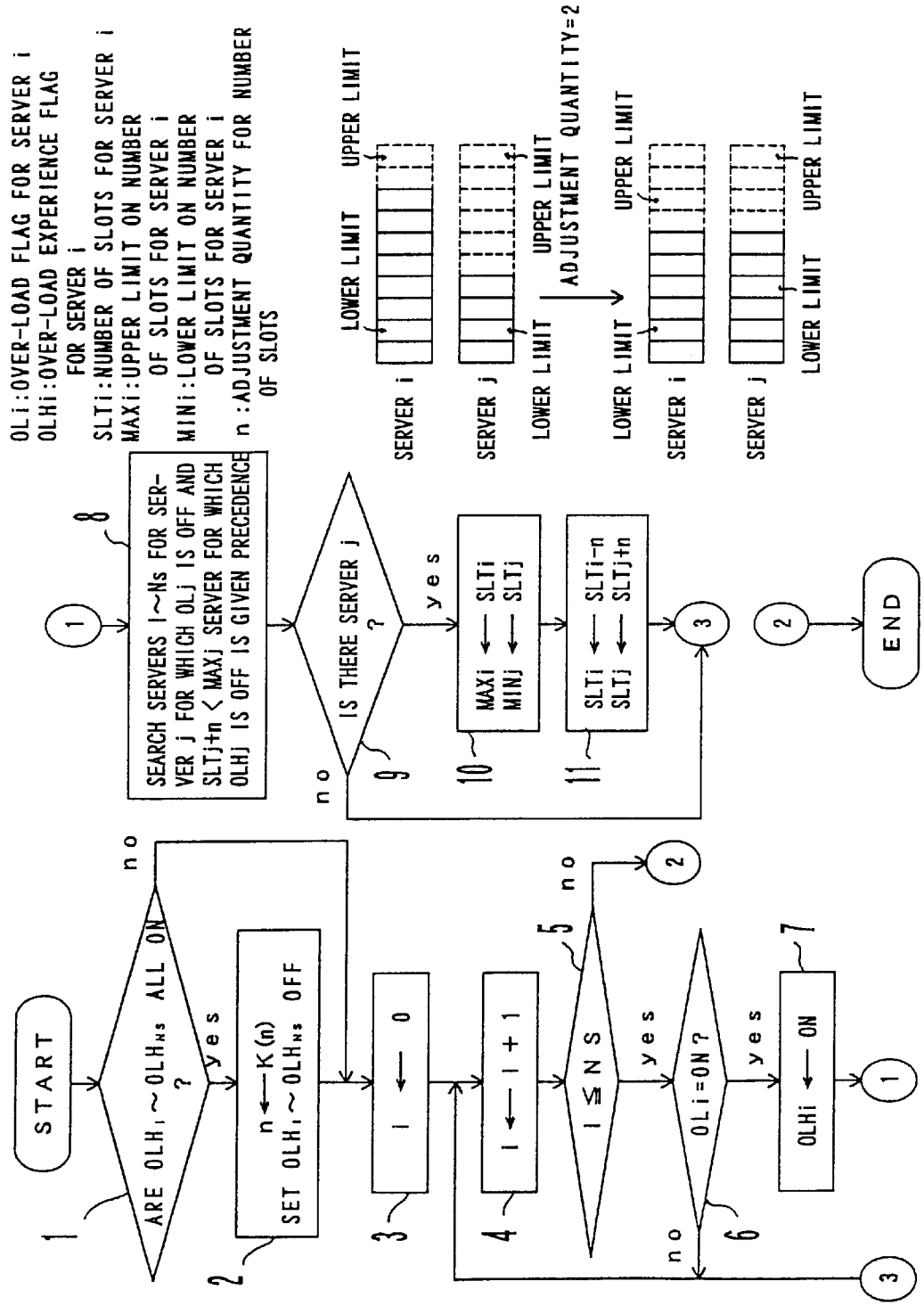
FIG. 17 is a flowchart for determination of upper and lower limit values for the number of slots.

In step S914, for the server considered to be over loaded, the number of slots set in the conversion table 4-a for that server is set as the maximum number of slots (FIGS. 16 and 17). In FIG. 17, OLi is the over load flag for server i, OLHi is the over-load experience flag for server i, SLTi is the number of slots for server i, MAXi is an upper limit on the number of slots for server i, MINi is a lower limit on the number of slots for server i, and n is a quantity of adjustment for the number of slots.

For a server considered to be over loaded, the number of slots set in the pattern hash table in the conversion table 4-a for that server is decreased by a decrement adjustment quantity in step S917. The decrement adjustment quantity, indicating the number of slots to be decreased, has been determined in step S915. The decrement adjustment quantity, which is an integer of, for example, three, must be set so as not to become smaller than the minimum number of slots allocated for that server. After the decrement adjustment quantity has been determined, a decision is made in step S916 as to whether or not it is equal to zero. If it is not, the number of slots for that server set in the hash table in the conversion table 4-a is decreased by the decrement adjustment quantity in step S917. In step S918, the over-load experience flag for that server having its allocated slots decreased is set ON.

Next, in step S919, a decision is made as to whether there are other servers which are not over loaded nor stopped. The criterion for this decision is the same as that in step S913. If there is no other server which is not over loaded nor stopped, then the procedure goes to step S927 to be described later. If the decision in step S919 is YES, a decision is made in step S920 as to whether or not, of the servers detected in step S919, there are servers for which the number of slots can be increased. If there are, a decision is made in step S921 as to whether or not, of the servers detected in step S920, there are servers for which the experience flag is OFF. If there are, then an arbitrary server, for example, a server which is the most lightly loaded, is selected from the servers in step S922. If there is no server for which the experience flag is OFF, then the procedure goes to step S923 in which an arbitrary server, for example, a server which is the most lightly loaded, is selected from the servers detected in step S920. In step S924, the number of slots which is set in the conversion table 4-*a* for that server selected in step S922 or S923 is set as the minimum number of slots (FIG. 16). Next, in step S926, the number of slots set in the pattern hash table in the conversion table 4-*a* for that server is increased by an increment adjustment quantity, which is determined in step S925. The increment adjustment quantity, which corresponds to a decrease in the number of slots for the other server considered to be over loaded, must be set so as not to become larger than the maximum number of slots set for that other server. After the increment adjustment quantity has been determined, the number of slots set in the pattern hash table in the conversion table for that server which is the most lightly loaded is increased by the adjustment quantity in step S926. In step S930, a decision is made as to whether all the servers have been handled.

If the decision in step S919 is NO and the decision in step S920 is NO, then the procedure goes to step S927 in which the number of slots, which has been decreased in step S917, is restored to the original number. And then, a decision is made in step S930 as to whether all the servers have been handled.

If, in step S919, the measurement of a server by the load measurement unit 6 shows an abnormal value, it is decided that the server is stopped. After that, in step S928, a decision is made as to whether all other servers are stopped. If not all servers are stopped, then the number of slots for that server considered to be stopped is made zero in step S929. The procedure then goes to step S919 in which a decision is made as to whether there is any other server which is not over loaded nor stopped.

Figure 18:
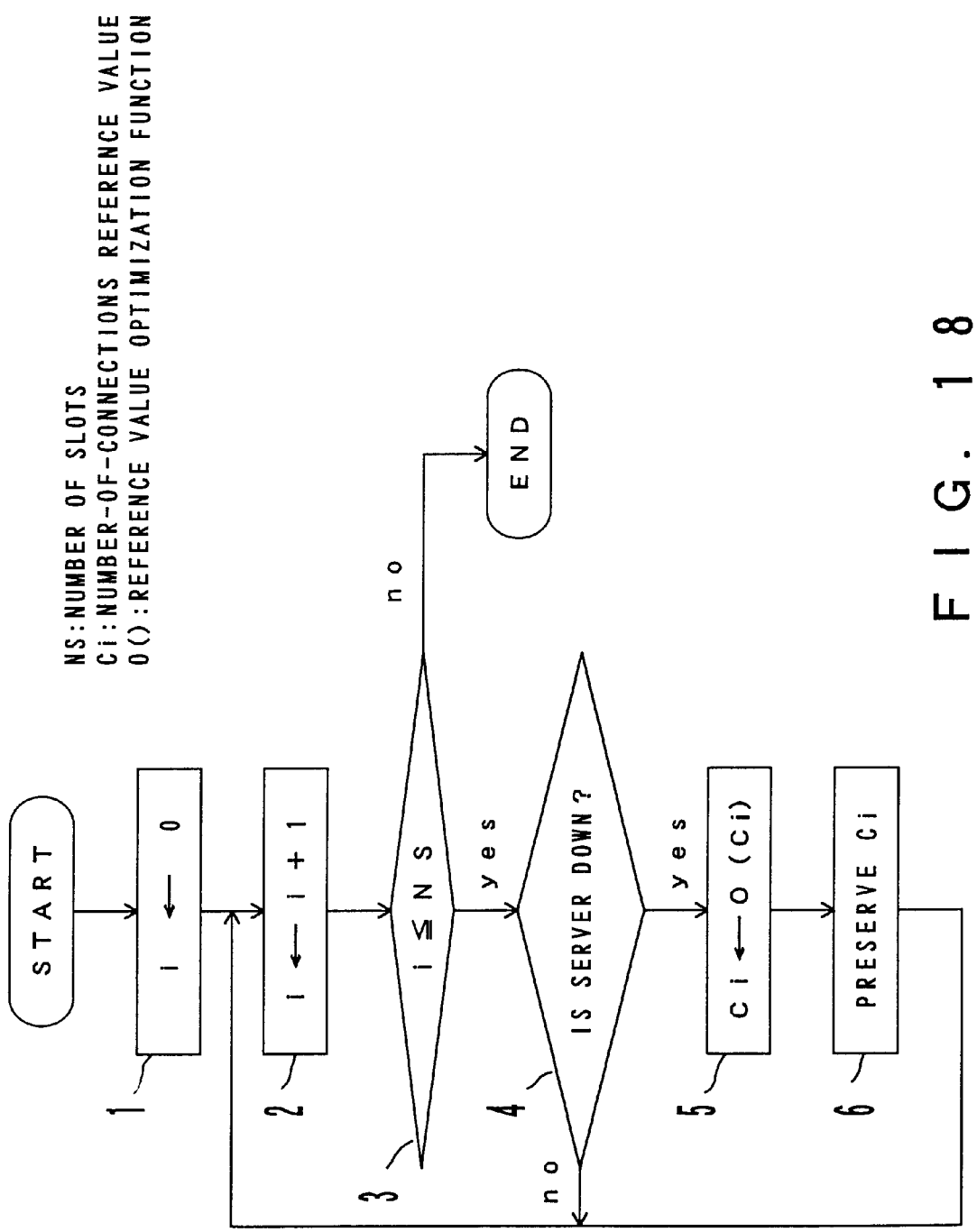
FIG. 18 is a flowchart for judgment of "server stop" due to over load.

FIG. 18 is a flowchart for deciding that a server is in the stopped state because of abnormality due to it being too much over loaded. In this figure, NS is the number of servers, Ci is a number-of-connections reference value for server i, and O (Ci) is a reference value optimization function. By making the number of slots for a server considered to be in the stopped state zero, service distribution to the server can be stopped and the server stopping can be hidden from clients.

Figure 19:
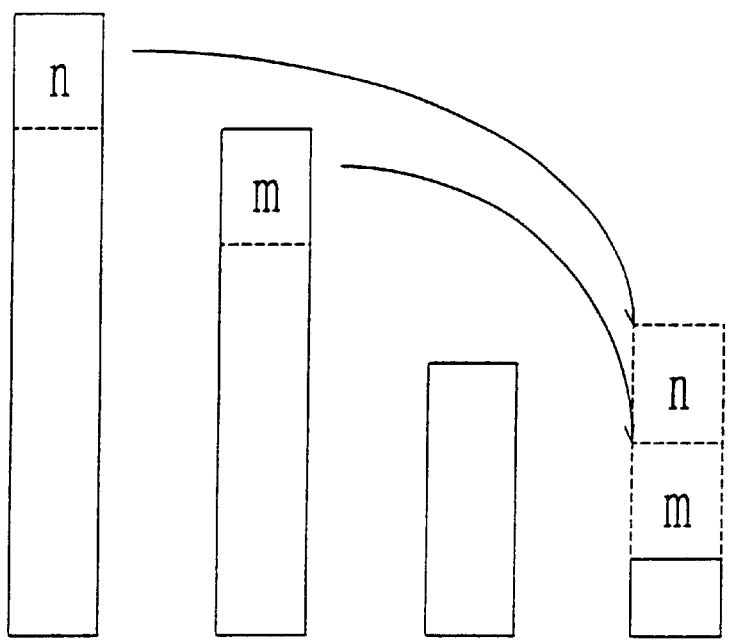
FIG. 19 is a diagram for use in explanation of variations in the number of slots.

FIG. 19 shows variations in the number of slots for servers. Server 1 is one which is considered to be over loaded and for which the experience flag is ON. The number of slots is decreased by n. Server 2 is one which is considered to be over loaded and for which the experience flag is OFF. The experience flag is set ON and the number of slots is decreased by m. Server 3 is one which, although its experience flag is ON, is not considered to be over loaded. Server 4 is one which is not considered to be over loaded and for which the experience flag is OFF. Thus, the number of slots for server 4 is incremented by n+m where n and m are decrements in the number of slots for servers 1 and 2, respectively.

If, in step S913, it is decided that a server is not over loaded nor stopped, then the procedure goes to step S930 in which a decision is made as to whether or not all the servers have been handled. If all the servers have not been handled, the variable i is incremented in step S931. The procedure then returns to step S913 to handle the next server.

Next, in step S932, a decision is made as to whether or not the over-load experience flag is ON for all the servers. In the presence of at least one server for which the over-load flag is not ON, return is made to step S911 to receive the load measurements. If the experience flag is ON for all the servers, it is returned to OFF for all the servers. In step S935, the decrement adjustment value, the initial value of which has been set to three in the previously described example, is changed to a proper value, for example, two, which is obtained by decrementing the initial value by one. The procedure then returns to step S911 to receive the load measurements.

That, in step S932, the over-load experience flag is ON for all the servers means that all the servers have undergone an adjustment of the number of slots. Further, the adjustment width becomes decreased by decreasing the decrement adjustment quantity In step S935. This means that the adjustment gradually converges in a limited number of times. The load on each server can be made to approach an optimum value.

The more slots the server is assigned, the more services it receives. Thus, the service distribution ratio can be controlled by the ratio of the numbers of slots assigned to the servers. When a server is over loaded, the connection average time increases and the number of connections to servers decreases, which is employed to detect the over-load state of the server. It therefore becomes possible to circumvent a misjudgment of over load as made when the number of connections to servers increases temporarily or connection itself is little made.

A fourth embodiment of the present invention is directed to a network load balancing device which is arranged as follows:

The conversion information storage unit includes a table in which a correspondence relationship of the first control unit to the second control units is established and a unit that maintains the correspondence relationship between the first control unit and the second control units throughout transmission of a sequence of packets. The distribution ratio adjusting unit comprises a unit that, when the measurement of the load on each second control unit shows an abnormal value, judges that it is in the stopped state, a unit that compares the connection average time and the number of connections for the second control unit with the connection average time reference value and the number-of-connections reference value which are the minimum connection average time and the maximum number of connections for the second control units, respectively, and considers a second control unit as over loaded for which the connection average time is sufficiently larger than the corresponding reference value and the number of connections is sufficiently smaller than the corresponding reference value, a unit that manages the service distribution ratio to the second control units as numbers allocated to the second control units. This management unit comprises a stopped state management unit that, in the presence of a second control unit considered to be in the stopped state, distributes the allocated number of that second control unit to second control units which are not in the stopped state at the ratio of the allocated numbers of those second control units, and a over load management unit that decreases the allocated number of a second control unit considered to be over loaded and increases the allocated numbers of second control units which are not over loaded. This over load management unit includes a unit that decreases the incremental or decremental value of the allocated numbers of the second control units with each adjustment cycle to thereby converge the service distribution ratio. The load measuring unit includes a unit that periodically measures the connection average time and the number of connections per unit time for each second control unit on the basis of data relayed to it and notifies the distribution ratio adjusting unit of the statuses of the second control units.

The more slots the server is assigned, the more services it receives. Thus, the service distribution ratio can be controlled by the ratio of the numbers of slots assigned to the servers. When a server is over loaded, the connection average time increases and the number of connections to the server decreases, which is employed to detect the over-load state of each server. It therefore becomes possible to circumvent a misjudgment of over load as made when the number of connections to a server increases temporarily or connection itself is little made.

A fifth embodiment of the present invention is directed to a network load balancing device which further includes a status management unit which preserves the status before adjustment and restores the status to the original status at recovery time.

The more slots the server is assigned, the more services it receives. Thus, the service distribution ratio can be controlled by the ratio of the numbers of slots assigned to the servers. When a server is over loaded, the connection average time increases and the number of connections to the server decreases, which is employed to detect the over-load state of each server. It therefore becomes possible to circumvent a misjudgment of over load as made when the number of connections to a server increases temporarily or connection itself is little made.

A sixth embodiment of the present invention is directed to a network load balancing device which is arranged as follows:

The conversion information storage unit includes a table in which a correspondence relationship of the first control unit to the second control units is established and a unit that maintains the correspondence relationship of the first control unit to the second control units throughout transmission of a sequence of data packets. The distribution ratio adjusting unit comprises a unit that, when the measurement of the load on each second control unit shows an abnormal value, judges that it is in the stopped state, and a stopped state management unit that manages the distribution ratio to the second control units as the allocated numbers for the second control units in the conversion information and, in the presence of a second control unit considered to be in the stopped state, distributes the allocated number of that second unit to second control units which are not in the stopped state at the ratio of the allocated numbers of those second control units.

The more slots the server is assigned, the more services it receives. Thus, the service distribution ratio can be controlled by the ratio among the numbers of slots assigned to the servers. When a server is over loaded, the connection average time increases and the number of connections to the server decreases, which is employed to detect over loading of the server. It therefore becomes possible to circumvent a misjudgment of over load as made when the number of connections to a server increases temporarily or connection itself is little made.

Although the flow of load measurement and the flow of load balancing have been described in terms of several steps, other examples of these steps will be described next.

A seventh embodiment of the present invention is directed to a network load balancing device which is arranged as follows:

The load measuring unit includes a unit that measures the number of connection errors and the number of connections per unit time for each second unit on the basis of data relayed to it and notifies the distribution ratio adjustment unit of the measurements at regular intervals. The distribution ratio adjusting unit further comprises a unit that, when the measurement of the load on each second control unit shows an abnormal value, judges that it is in the stopped state, compares the connection error rate and the number of connections for each second control unit with a connection error rate reference value and a number-of-connections reference value which are the minimum connection error rate, which is represented by the ratio of the number of connection errors to the number of connections, and the maximum number of connections for the second control units, respectively, and considers a second control unit as over loaded for which the connection error rate is sufficiently larger than the corresponding reference value and the number of connections is sufficiently smaller than the corresponding reference value.

In step S111 of FIG. 11, the load measurement unit 6 measures the time interval between the time of transmission of a connect request signal to a server and the time of reception of a connect complete signal from it prior to transmission of packet data and uses, as the measurements of the load on it, the connection average time and the number of connections per unit time which are sought from the measured time interval. As an alternative, it may be arranged to detect connection errors for the connect request signal and use the connection error rate (the ratio of the number of connection errors detected to the number of connections) and the number of connections per unit time. In this case, the criterion for considering a server to be over loaded in step S913 is that the connection error rate per unit time is higher than a connection error rate reference value and the number of connections per unit time is smaller than a number-of-connections reference value. The connection error rate reference value and the number-of-connections reference value used here are respectively defined to be the minimum correction error rate and the maximum number of connections per unit time, which have been obtained so far.

Figure 20:
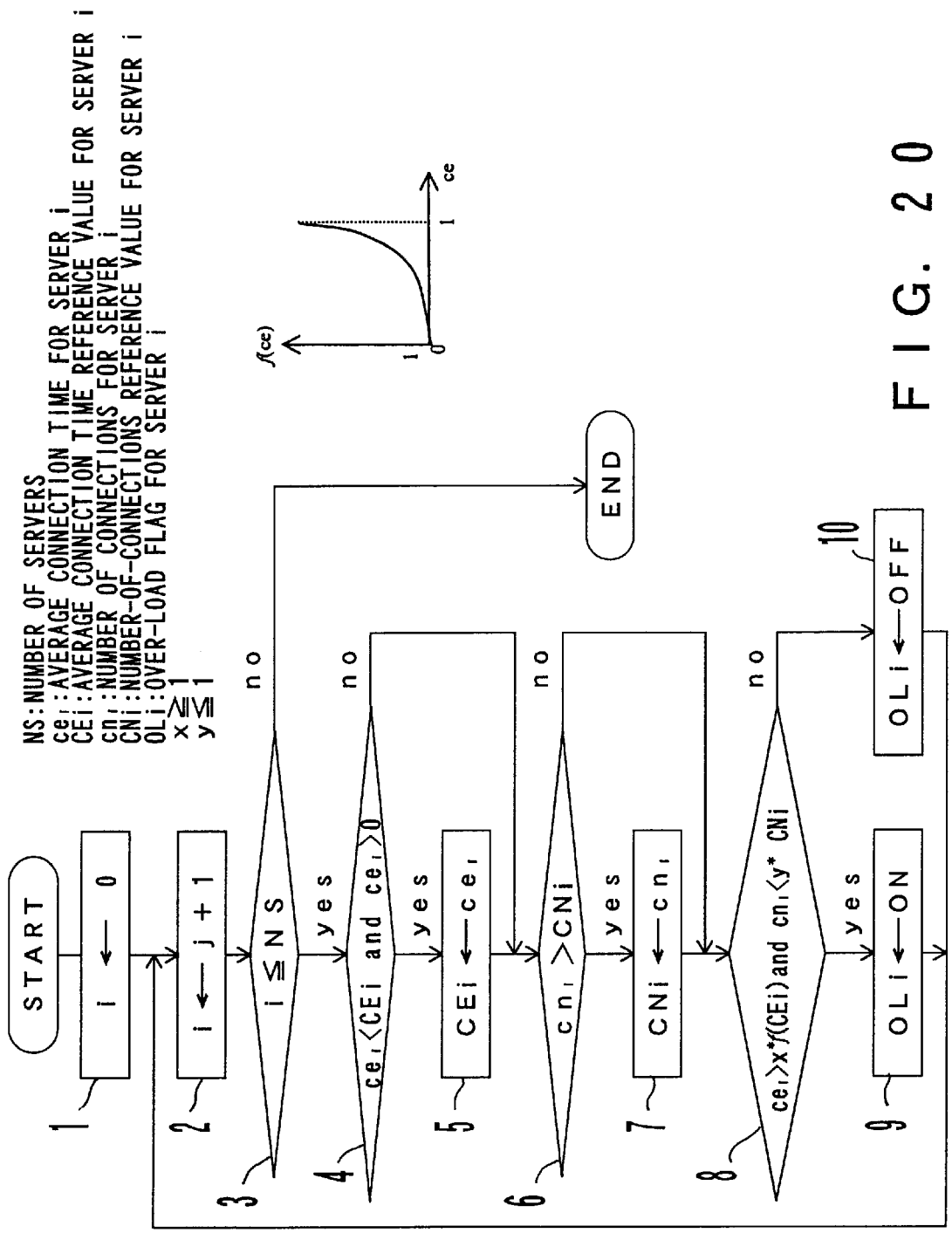
FIG. 20 is a flowchart for judgment of over load.

FIG. 20 is a flowchart for high load judgment, which employs the connection error rate per unit time and the number of connections per unit time as the criterion in step S913 of FIG. 12 for deciding whether a server is over loaded. In this figure, NS is the number of servers, cei is the connection average time for server i, CEi is the connection average time reference value for server i, cni is the number of connections for server i, CNi is the number-of-connections reference value for server i, and OLi is the high load flag for server i.

Since the number of connection errors and the number of connections are measured, load balancing can be made even if another route is taken between a server and a client.

An eighth embodiment of the present invention is directed to a network load balancing device which is characterized in that the load measuring unit further includes a unit that measures the number of virtual circuits (VCs) for each of the second control units on the basis of data relayed to it and notifies the distribution adjustment unit of the measurement at regular intervals, and the distribution ratio adjustment unit further includes a unit that considers a second control unit for which the number of VCs exceeds a preset reference value to be over loaded.

Since the number of VCs is used for over load judgment, it is possible to estimate the load on a server even in a case where the time interval between the commencement and termination of a service is long and hence the number of connections is small.

A ninth embodiment of the present invention is directed to a network load balancing device which is characterized in that the load measurement unit measures the response time between the commencement and termination of transmission for each of the second control units on the basis of data relayed to it and notifies the distribution ratio adjustment unit of the result at regular intervals, and the distribution ratio adjustment unit further includes a unit that considers a second control unit to be over loaded for which the response time exceeds a preset reference value.

Alternatively, in step S111 of FIG. 11, the load measurement unit 6 may measure the number of VCs for each second server and provide the number of VCs per unit time as the measurement of the load on it. In this case, the criterion in step S913 for considering the second sever to be over loaded is that the number of VCs per unit time is larger than a reference value for the number of VCs. The reference value used here is one that has been set in advance.

Figure 21:
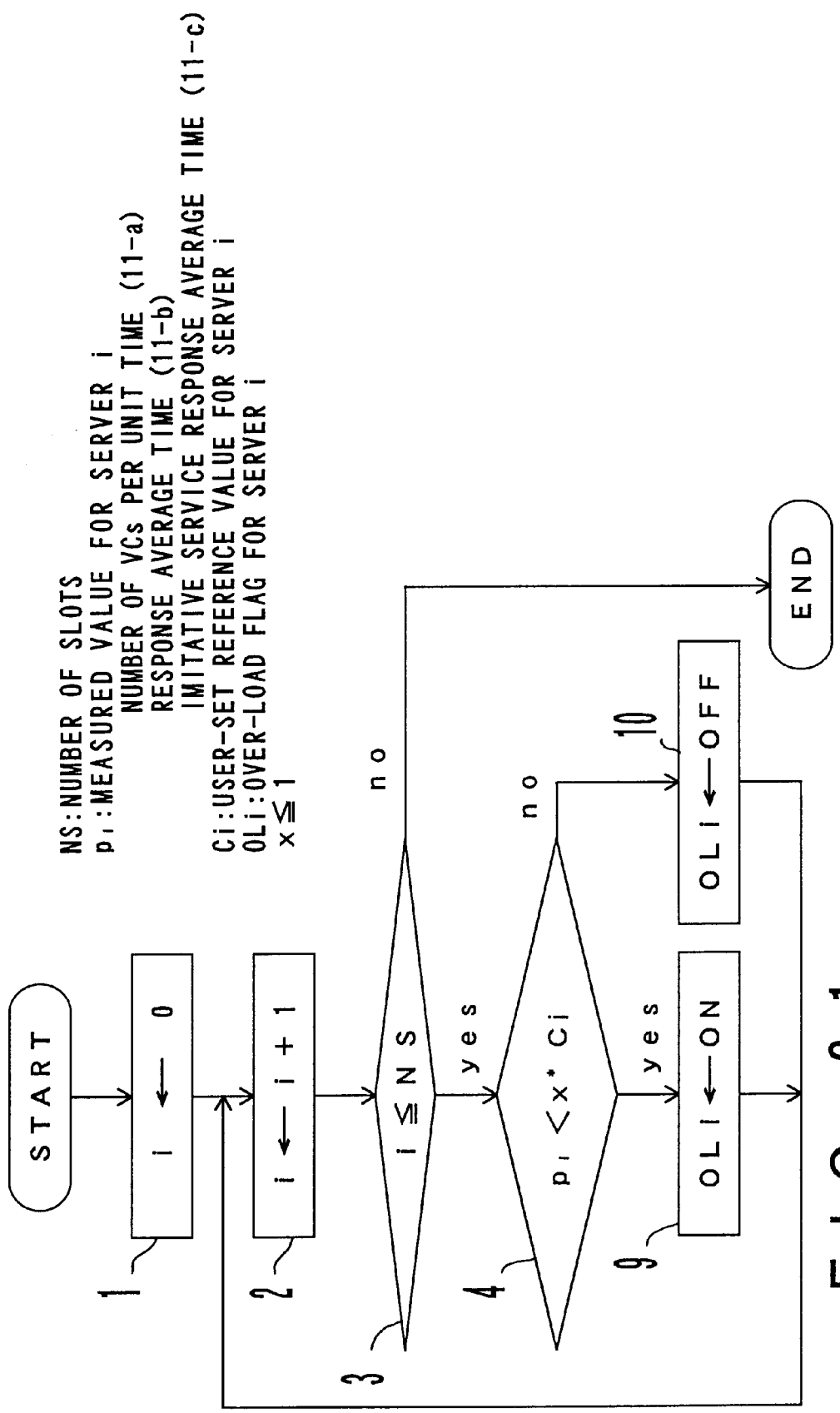
FIG. 21 is a flowchart for judgment of over load.

FIG. 21 is a flowchart for over-load judgment, which employs the number of VCs per unit time as the criterion in step S913 of FIG. 12 for deciding whether a server is over loaded. In this figure, NS is the number of servers, Pi is the number of VCs, the response average time, and the imitated service response average time for server i, Ci is the user-set reference value for server i, and OLi is the over load flag for server i.

Since the service response time is employed for over-load judgment, the real-time load judgment can be made.

A tenth embodiment of the present invention is directed to a network load balancing device which is characterized in that the load measurement unit performs an operation determined by imitating the first control unit in data sent by each second control unit, measures the service time required to perform the operation, and notifies the distribution ratio adjustment unit of the average time, and the distribution ratio adjustment unit further includes a unit that decides that a second control unit is over loaded for which the service average time is larger than a preset reference value.

Alternatively, in step S111 of FIG. 11, the load measurement unit 6 may measure the response time between the commencement and termination of a service for each server and provide the response average time per unit time as the measurement of the load on it. In this case, the criterion in step S913 of FIG. 12 for considering the sever to be over loaded is that the response average time per unit time is larger than a response average time reference value. The reference value used here is one that has been set in advance.

In FIG. 21, the response average time (11-b) is employed as the criterion in step S913 of FIG. 12 for deciding whether a server is over loaded.

Since the response time for an imitated service is used for over load judgment, load measurement that reflects a difference in characteristic between each service can be made.

Figure 22:
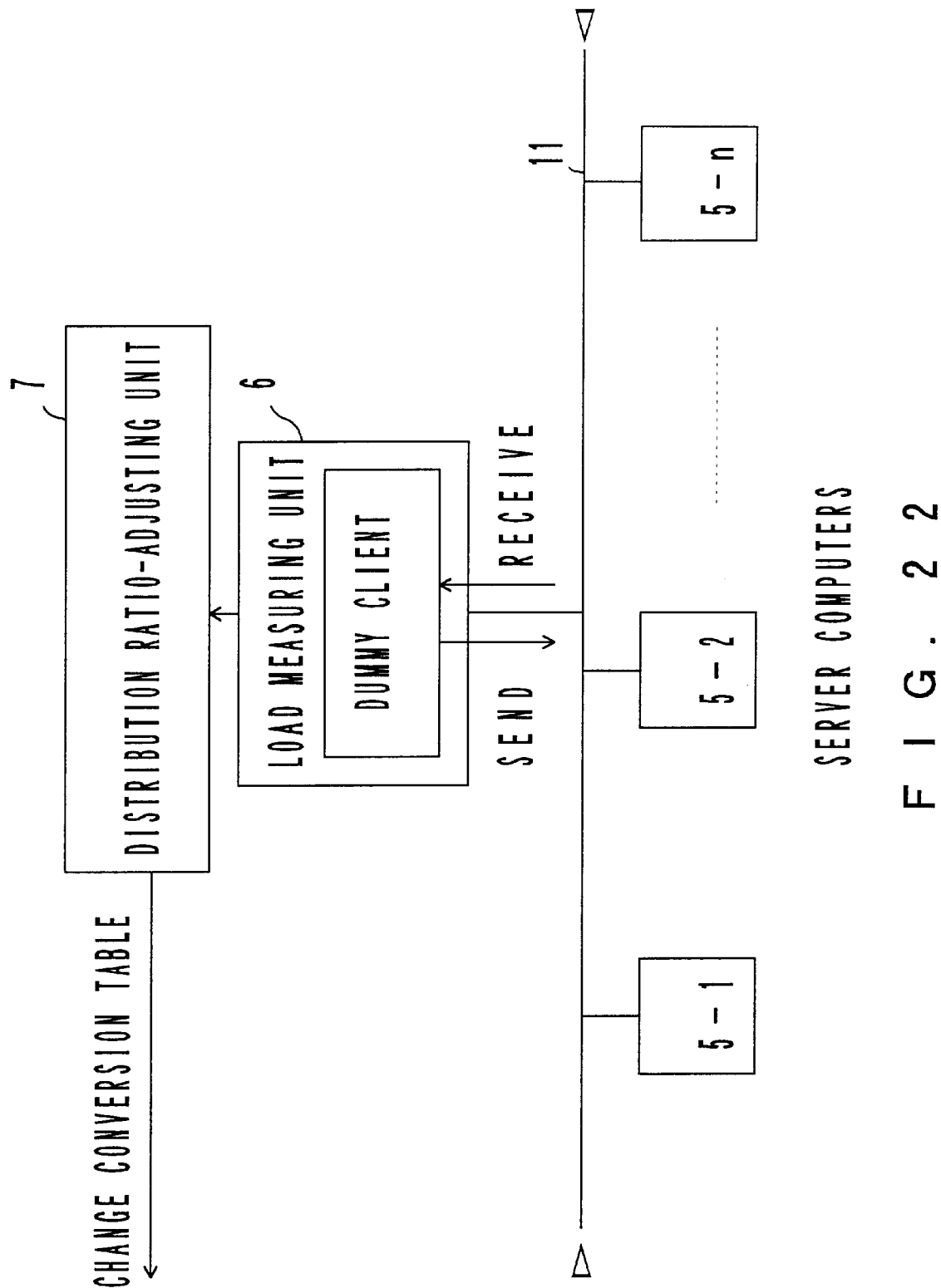
FIG. 22 is a block diagram for load measurement using a dummy client.

Further, in step S111 of FIG. 11, as a dummy client the load measurement unit 6 may perform some service operation in imitation of a client, measures the response time between the commencement and termination of the service, and provides the imitative service response average time as the load measurement, as shown in FIG. 22. In this case, the criterion in step S913 of FIG. 12 for considering the sever to be over loaded is that the imitative service response average time per unit time is larger than an imitative service response average time reference value. The reference value used here is one that has been set in advance.

In FIG. 21, the imitative service response average time (11-c) is employed as the criterion in step S913 of FIG. 12 for deciding whether a server is over loaded.

An eleventh embodiment of the present invention is directed to a network load balancing device which is characterized by further comprising a unit that allows an operator to set the reference value used in the distribution ratio adjustment unit for over load judgment.

As described previously, In step S913 of FIG. 12, the minimum connection average time per unit time, the maximum number of connections per unit time, or the connection error rate reference value per unit time, which are obtained by measurements, is used as the connection average time reference value, the number-of-connections reference value, or the connection error rate reference value. However, the inventive device may be modified such that an operator can specify these reference values.

Figure 23:
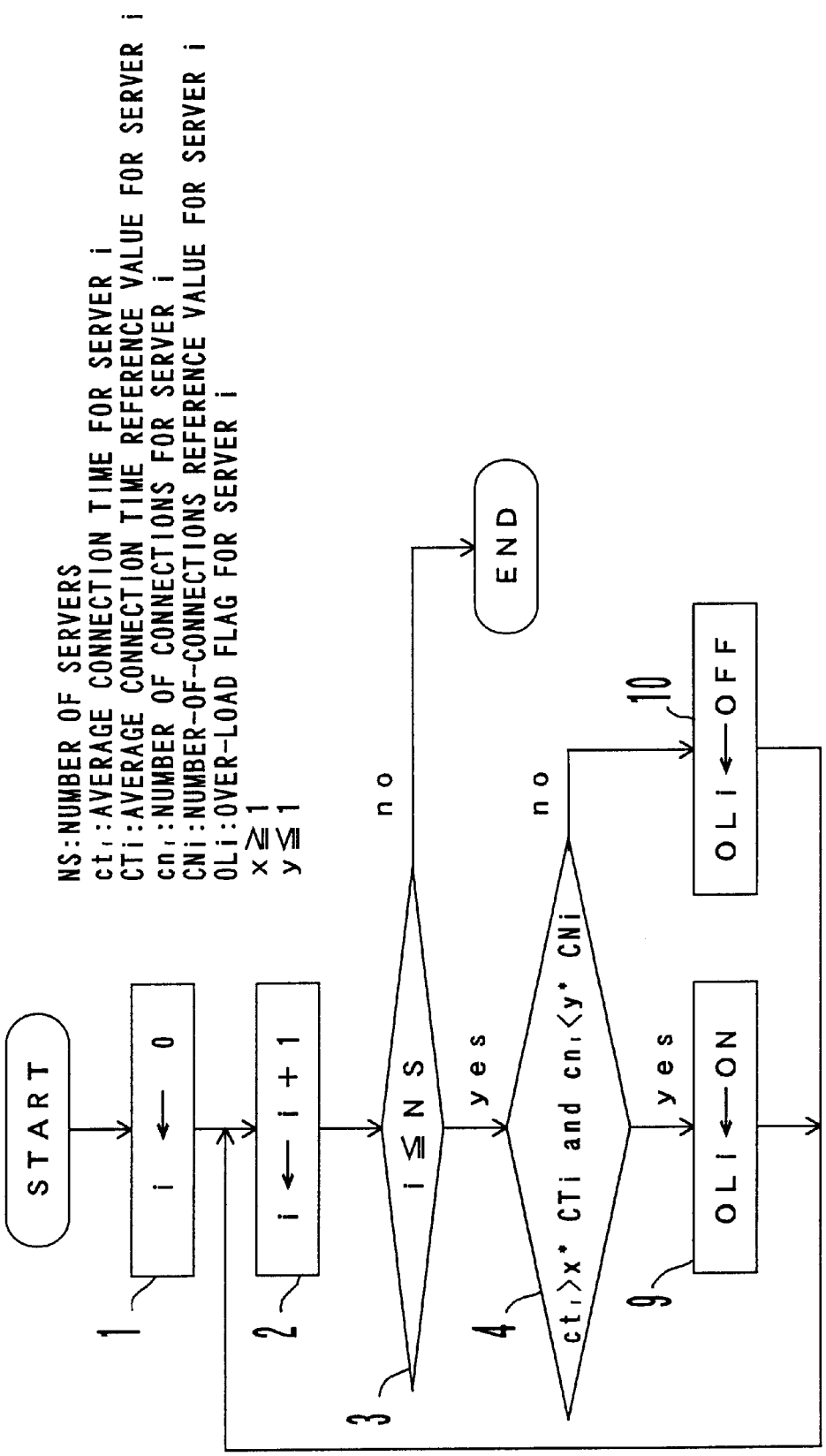
FIG. 23 is a flowchart for judgment of over load.

FIG. 23 is a flowchart for over load judgment in which the connection average time reference value and the number-of-connections reference value are set by the operator. In this figure, NS is the number of servers, cti is the connection average time for server i, CTi is the connection average time reference value for server i, cni is the number of connections for server i, CNi is the number-of-connections reference value for server i, and OLi is the over load flag for server i.

Figure 24:
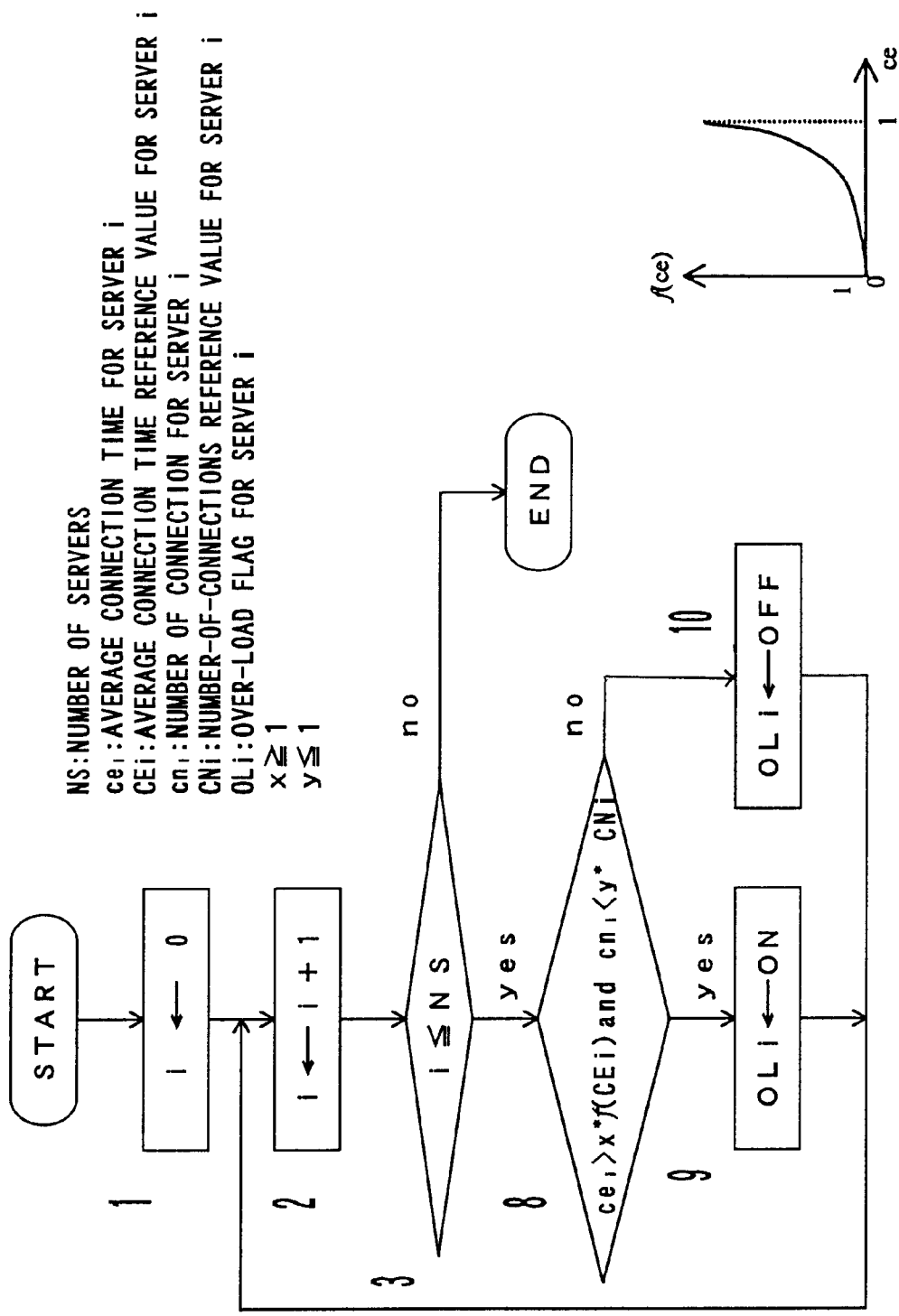
FIG. 24 is a flowchart for judgment of over load.

FIG. 24 is a flowchart for over load judgment in which the connection error rate reference value and the number-of-connections reference value are set by the operator. In this figure, NS is the number of servers, cei is the connection average time for server i, CEi is the connection average time reference value for server i, cni is the number of connections for server i, CNi is the number-of-connections reference value for server i, and OLi is the over-load flag for server i.

If, since the operator sets the reference values, optimum values are known, the settings will immediately be reflected in the load measurement.

A twelfth embodiment of the present invention is directed to a network load measurement device which is characterized in that the distribution ratio adjustment unit further comprises a unit that detects a second control unit considered to be stopped, preserves the reference values at that point, and employs the preserved reference values after recovery of the stopped server.

The reference value, such as the connection average reference value, the number-of-connections reference value, the connection error rate reference value, the number-of-VCs reference value, the response average time reference value, or the imitative service response average time reference value, may be preserved in the status management unit 10 on a timely basis. For example, the reference value may be preserved at the time a stopped server is detected. In this case, when the stopped server is recovered, the preserved reference value is fetched and used.

Since the reference values when a stopped server is detected are preserved, the service will not be stopped again under the same situation.

A thirteenth embodiment of the present invention is directed to a network load measurement device which is characterized in that the distribution ratio adjustment unit further comprises a unit that determines an increment or decrement value for the number of slots allocated to a second control unit when it is considered to be over loaded according to the number of slots which has already been allocated to it at that time.

In step S915 of FIG. 12, a decrement value to be determined is selected to be a preset integer of, for example, three. Alternatively, a predetermined percentage of the number of slots set in the conversion table 4-a for a server which is considered to be over loaded may be set as the decrement value.

Since the quantity of adjustment is incremented or decremented by a percentage of the number of slots allocated to a server, the quantity of adjustment will not vary greatly from server to server.

A fourteenth embodiment of the present invention is directed to a network load balancing device which is characterized in that the distribution ratio adjustment unit further includes a unit that distributes the number of slots assigned to a second control unit when it is considered to be over loaded to all other second control units which are not over loaded according to the ratio of the numbers of slots assigned to those second control units at that time.

The decrement value for the number of slots assigned to a server which is considered to be over loaded is determined in step S915 of FIG. 12. The decrement value may be updated by seeking the average value of load information and then the numbers of slots allocated for servers whose differences from the average value are greater than a predetermined value according to the ratio among their distances from the average value.

Figure 25:
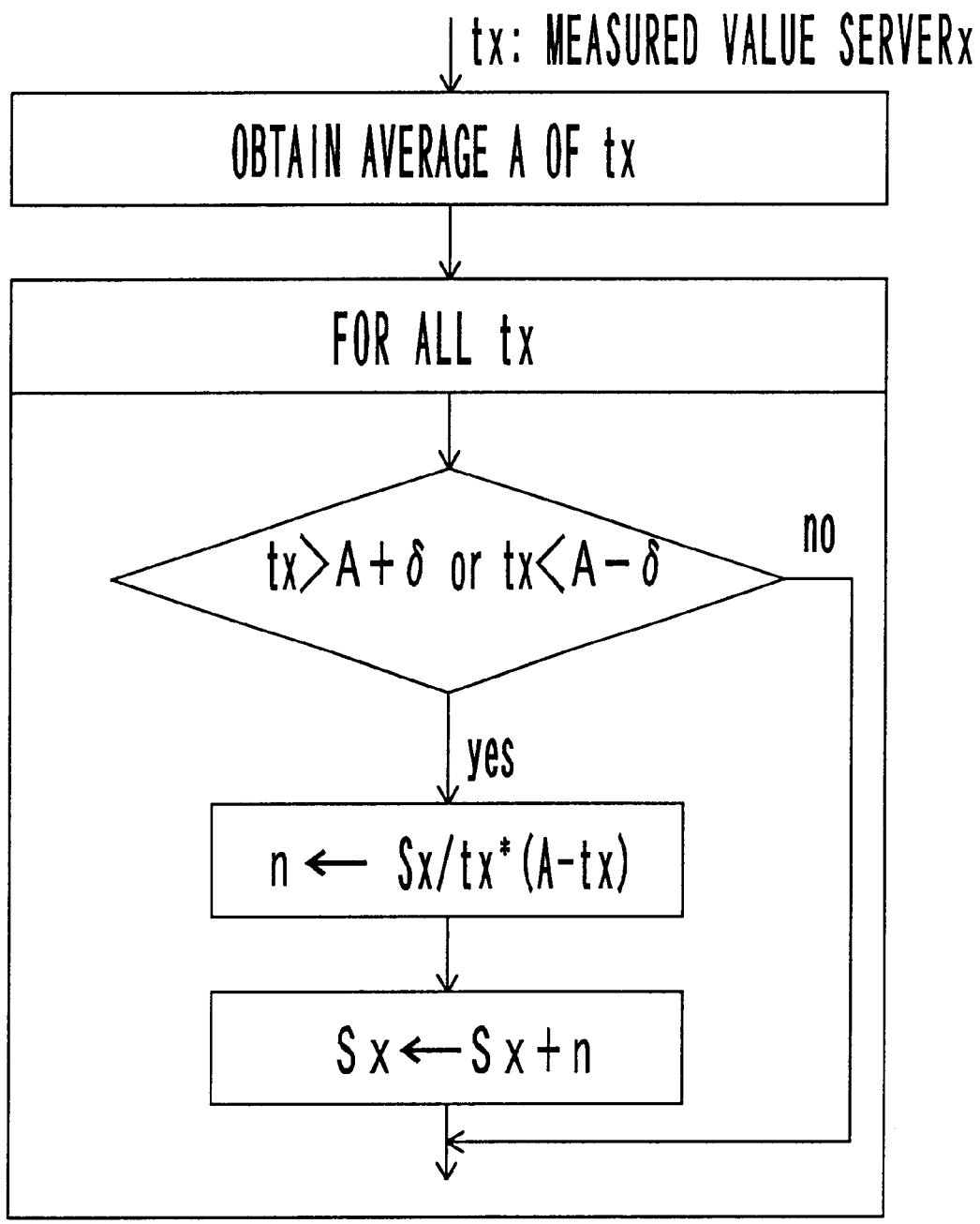
FIG. 25 is a flowchart for determining servers whose measured values differ from the average measured value by an arbitrary value.

FIG. 25 is a flowchart for load balancing operation to allow the server capabilities viewed from clients to be made constant by seeking servers whose differences are a predetermined value greater than the average measured value. In this figure, tx is the measured value for server x.

Since the adjustment quantity is incremented or decremented on the basis of the ratio among the number of slots allocated for servers which are not over loaded, the adjustment quantity will not vary greatly from server to server when there is a large difference in processing capabilities among the servers.

A fifteenth embodiment of the present invention is directed to a network load measurement device which is characterized in that the distribution ratio adjustment unit further comprises a unit that seeks the average of the measured values of the loads on second control units and then determines the numbers of slots allocated for second control units whose measured value differ from the average by width 6 according to the ratio among their distances from the average.

The incremental quantity of adjustment for the number of slots for a server considered to be not over loaded nor stopped is determined in step S915 of FIG. 12. The increment quantity may be updated by seeking the numbers of slots allocated for servers whose differences from the average value of load information are greater than a predetermined value according to the ratio among their distances from the average value.

Since the server response delays viewed from clients are made constant from client to client, each client can be provided with services equally.

In step S915 of FIG. 12, the incremental adjustment quantity for each server which is considered to be not over loaded or stopped may be set equal to the decremental adjustment quantity for another server considered to be over loaded (FIGS. 17 and 18).

Figure 26:
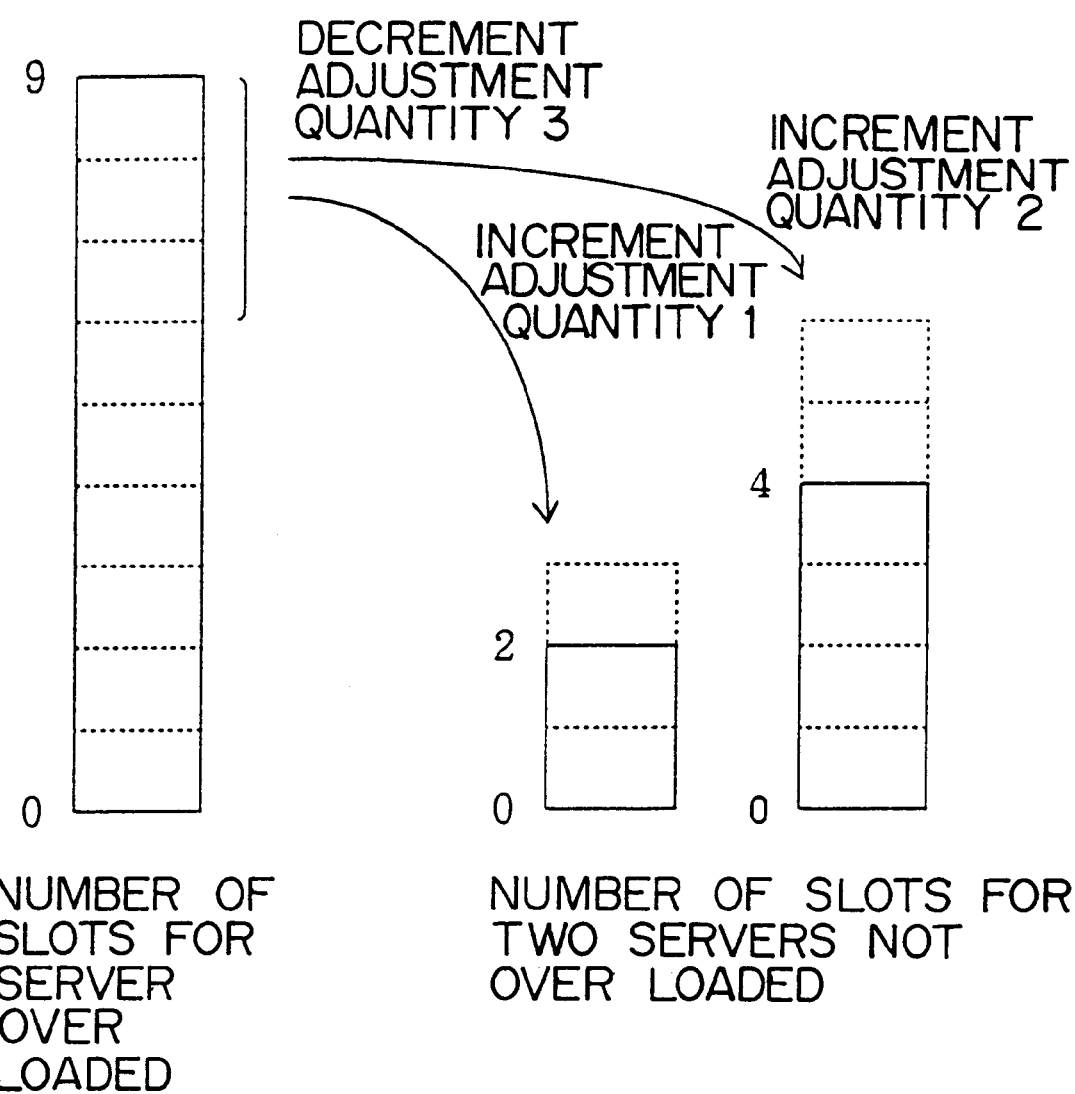
FIG. 26 is a diagram for use in explanation of variations in the number of slots.

In step S915 of FIG. 12, the incremental adjustment quantities for servers considered to be not over loaded or stopped may be determined according to the numbers of slots allocated for those servers in the conversion table 4-*a* as shown in FIG. 26.

Figure 27:
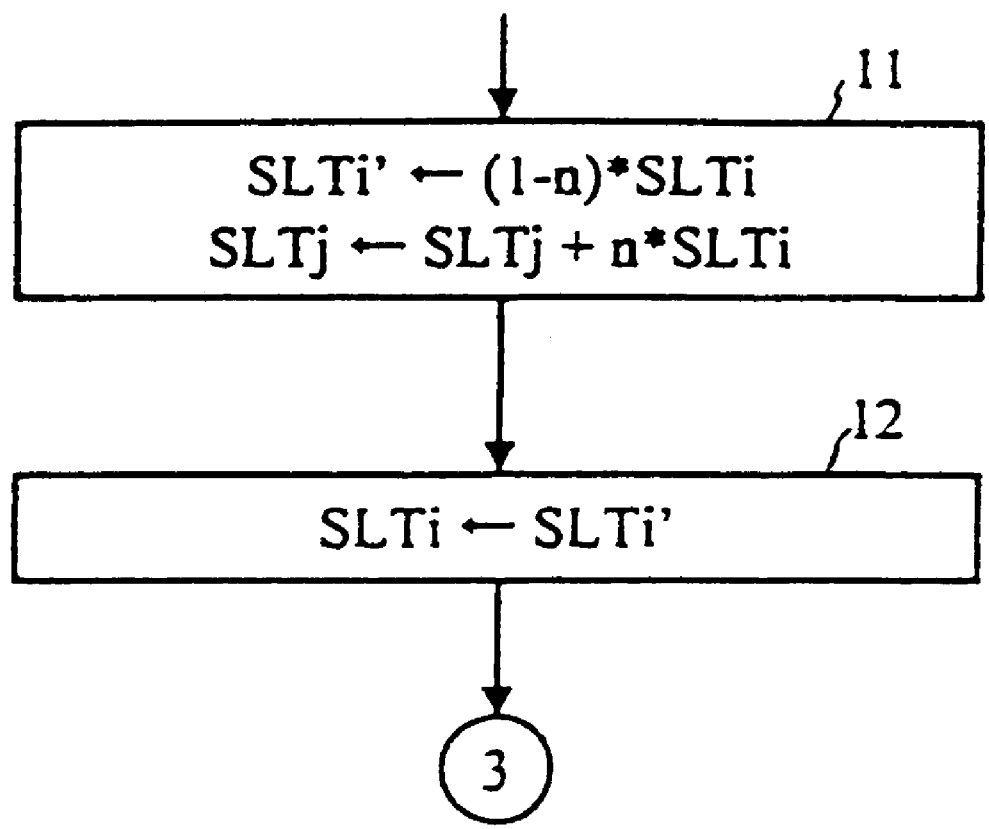
FIG. 27 is a flowchart for allocating the slots to each server according to the conversion table.

FIG. 27 is a flowchart for allocating slots for servers according to the number of slots allocated for them in the conversion table 4-*a*, which is used in place of step S11 of FIG. 18.

A sixteenth embodiment of the present invention is directed to a network load balancing device which is characterized by further comprising a failure monitor unit that performs a ping command to each second unit at regular intervals, decides that a second unit which causes a certain number of time-outs is in the stopped state, and notifies the distribution ratio adjustment unit of it.

Figure 28:
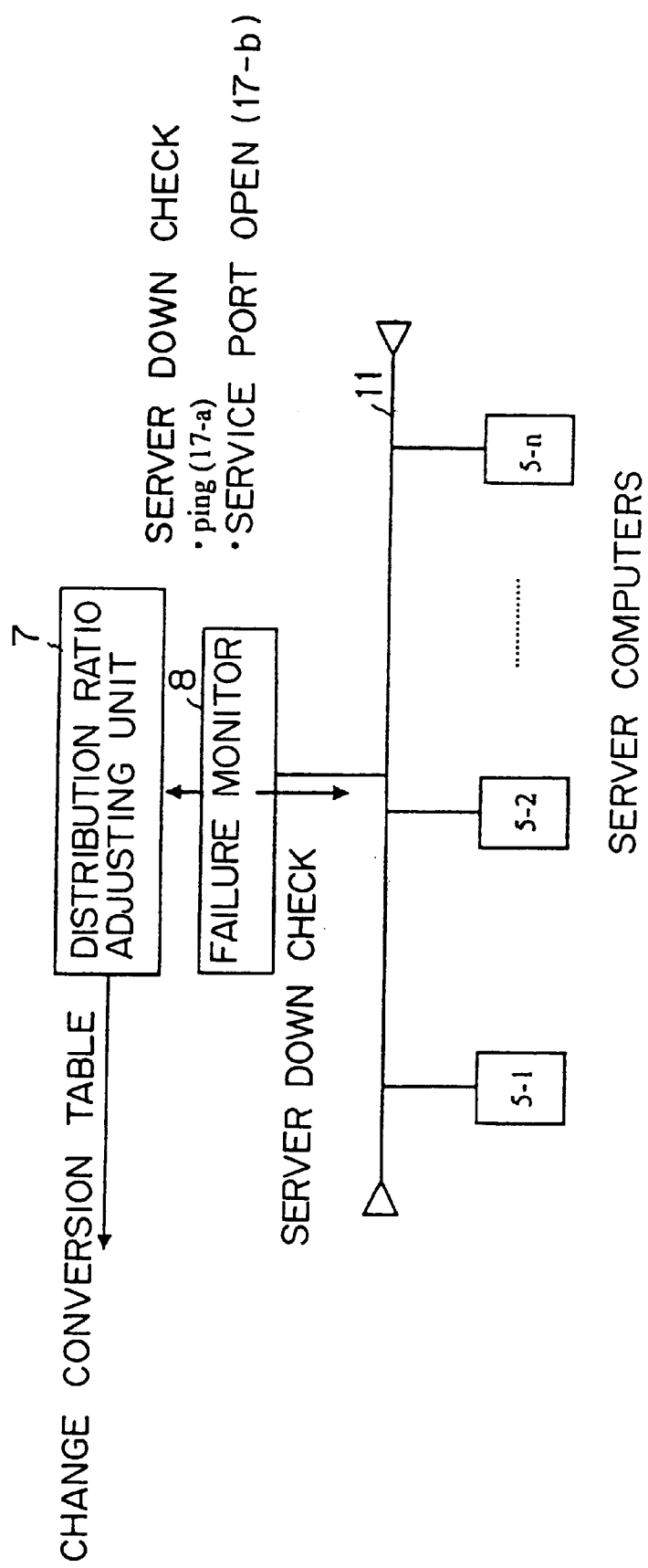
FIG. 28 is a block diagram of the failure monitor of FIG. 2.

In step S913 of FIG. 12, a server for which the measurement by the load measurement unit 6 indicates an abnormal value is considered to be stopped. A failure monitor unit 8 that performs a ping command to each second unit at regular intervals, decides that a second unit which causes a certain number of time-outs is in the stopped state, and notifies the distribution ratio adjustment unit of it may be provided separately as shown in FIG. 28. Of course, the server stop judgment by the load measurement unit 6 and the server stop judgment by the failure monitor unit 8 may be used in combination.

Thereby, the accuracy of the detection of server stops is increased.

A seventeenth embodiment of the present invention is directed to a network load balancing device which is characterized in that the failure monitor unit further includes a unit that tries whether it is possible to open a service port to transmit information from each second control unit, deciding, after a certain number of failures, that the transmit information is being stopped, and notifies the distribution ratio adjustment unit.

As shown in FIG. 28, the failure monitor unit 8 may be arranged to, in addition to a ping command, try whether it is possible to open a service port to a server service and decide, after a certain number of failures, that the service is in the stopped state.

Since stops on the application layer can be detected, the hiding and maintenance of failures can be performed on a service-by-service basis.

Figure 29A:
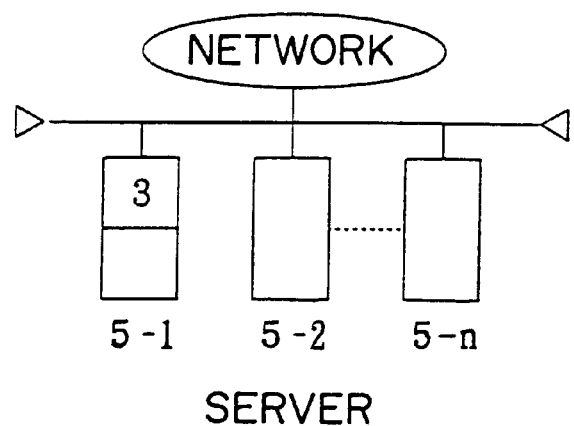
FIG. 29A shows another system configuration.
Figure 29B:
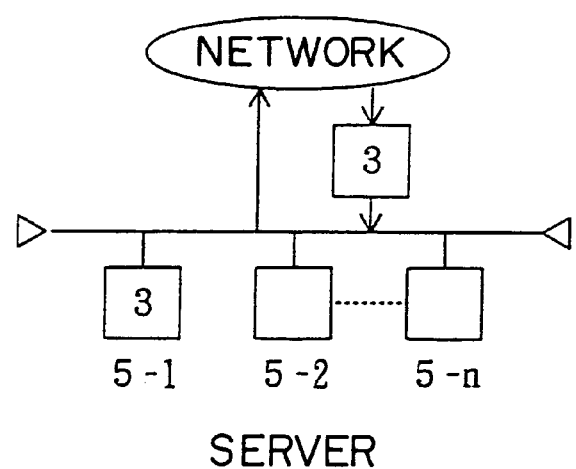
FIG. 29B shows still another system configuration.
Figure 29C:
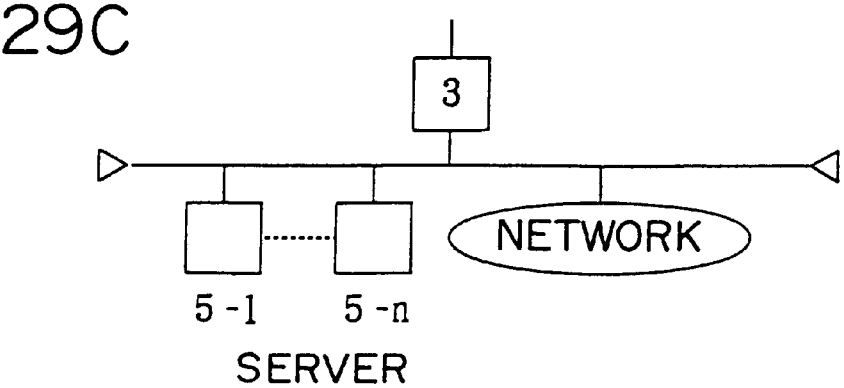
FIG. 29C shows a further system configuration.

The present invention has been described so far in terms of one form, that the network service server load balancing device 3 receives packets from the clients 1-1, 1-2, ..., 1-*m* over the network 2, then transfers them to the servers 5-1, 5-2, ..., 5-*n*, and receives services from the servers, then return them to the clients over the network. The network service server load balancing device 3 may be employed in other forms: it is placed on one of the servers as shown in FIG. 29A; the device is used to send packets from the clients to servers, but not used to return services from the servers to the clients as shown in FIG. 29B; and the device also accommodates another network as an object of load balancing as shown in FIG. 29C.

An eighteenth embodiment of the present invention is directed to a network load balancing device characterized in that one second control unit includes the network load balancing unit.

Thus, there is no necessity of addition of a new hardware device at the time the system is installed.

A nineteenth embodiment of the present invention is directed to a network load balancing device which further includes another communication path directed from the second to the first control unit in addition to the communication path that passes through the network load balancing device.

Thereby, the overall processing efficiency of the third control unit can be increased.

A twentieth embodiment of the present invention is directed to a network load balancing device characterized by further comprising a unit consisting of a group of the second control units of multisegment configuration to which another network is connected.

Thereby, it becomes possible for the third control unit to make load balancing over the entire network. The load balancing can be made using the present flow of data. The load will not be increased due to load measurement.

A twenty-first embodiment of the present invention is directed to a network load balancing device characterized in that the first control unit is a client computer connected to a network, the second control units are server computers connected to the network, and the conversion information storage unit is a conversion table from the first control unit to the second control units.

Well-balanced efficient services can be provided because the load on each of servers that make up a network is measured and packets are sent from a client to servers according to the load condition of each server. Further, no server switching occurs in the middle of a sequence of services because it is known which server a sequence of packets is sent to.

A twenty-second embodiment of the present invention is directed to a network load balancing method, for use with a system in which data is transferred from a first control unit to a plurality of second control units over a network, which comprises: a conversion information storing step of storing conversion information which represents a correspondence relationship of the first control unit to the second control units; a distributive relay step of transferring the data sent by the first control unit to one or more of the second control units according to the correspondence relationship in the conversion information stored by the conversion information storing step; and a distribution ratio adjusting step of adjusting the correspondence relationship in the conversion information stored by the conversion information storing step; a load measuring step of measuring the load on each of the second control units and adjusting the correspondence relationship in the conversion information according to the load conditions of the second control units.

Well-balanced efficient services can be provided because packets are sent from a client to servers according to the load condition of each server. Further, no server switching occurs in the middle of a sequence of services because it is known which server a sequence of packets is being sent to.

A twenty-third embodiment of the present invention is directed to a computer-readable storage medium for use with a system in which data is transferred from a first control unit to a plurality of second control units over a network, which is recorded with a load balancing program which allows a computer to perform; a conversion information storing step of storing conversion information which represents a correspondence relationship of the first control unit to the second control units; a distributive relay step of transferring the data sent by the first control unit to one or more of the second control units according to the correspondence relationship in the conversion information stored by the conversion information storing step; and a distribution ratio adjusting step of adjusting the correspondence relationship in the conversion information stored by the conversion information storing step; a load measuring step of measuring the load on each of the second control units and adjusting the correspondence relationship in the conversion information according to the load conditions of the second control units.

Well-balanced efficient services can be provided because packets are sent from a client to servers according to the load condition of each server. Further, no server switching occurs in the middle of a sequence of services because it is known which server a sequence of packets is being sent to.

A twenty-forth embodiment of the present invention is directed to a network load balancing system which comprises a first control unit which sends data, a plurality of second control units which receives the data, and a third control unit which transfers the data sent by the first control unit to the second control units. The third control unit comprises: a conversion information storing unit for storing conversion information which represents a correspondence relationship of the first control unit to the second control units; a distributive relay unit for transferring the data sent by the first control unit to one or more of the second control units according to the correspondence relationship in the conversion information stored in the conversion information storing unit; and a distribution ratio adjusting unit for adjusting the correspondence relationship in the conversion information stored in the conversion information storing unit; and a load measuring unit for measuring the load on each of the second control units and notifying the distribution ratio adjusting unit of load conditions of the second control units in order to allow the distribution ratio adjusting unit to adjust the correspondence relationship in the conversion information stored in the conversion information storing unit.

Well-balanced efficient services can be provided because packets are sent from a client to servers according to the load condition of each server. Further, no server switching occurs in the middle of a sequence of services because it is known which server a sequence of packets is being sent to.

A twenty-fifth embodiment of the present invention is directed to an adjustment device for use with a system in which data is sent from a first control unit to a plurality of second control units, which comprises: a conversion information storing unit for storing conversion information which represents a correspondence relationship of the first control unit to the second control units; a distributive relay unit for transferring the data sent by the first control unit to one or more of the second control units according to the correspondence relationship in the conversion information stored in the conversion information storing unit; and a distribution ratio adjusting unit for adjusting the correspondence relationship in the conversion information stored in the conversion information storing unit; and a load measuring unit for measuring the load on each of the second control units and notifying the distribution ratio adjusting unit of load conditions of the second control units in order to allow the distribution ratio adjusting unit to adjust the correspondence relationship in the conversion information stored in the conversion information storing unit.

Well-balanced efficient services can be provided because packets are sent from a client to servers according to the load condition of each server. Further, no server switching occurs in the middle of a sequence of services because it is known which server a sequence of packets is being sent to.

A twenty-sixth embodiment of the present invention is directed to a control device for use with a system in which data is sent from a first control unit to a plurality of second control units, which comprises: a conversion information storing unit for storing conversion information which represents a correspondence relationship of the first control unit to the second control units; a distributive relay unit for transferring the data sent by the first control unit to one or more of the second control units according to the correspondence relationship in the conversion information stored in the conversion information storing unit.

No server switching occurs in the middle of a sequence of services because it is known which server a sequence of packets is being sent to.

A twenty-seventh embodiment of the present invention is directed to a network load balancing device for use with a system in which data is sent from a client to servers, which comprises a unit which stores relevant data so that it will be processed in a corresponding server and a unit which decides whether each server is over loaded and, if it is, balances the load on that server so that it will be distributed to the other servers.

Well-balanced efficient services can be provided because packets are sent from a client to servers according to the load condition of each server. Further, no server switching occurs in the middle of a sequence of services because it is known which server a sequence of packets is being sent to.

The present invention can be applied to a single device, a system or integrated device composed of multiple units, or a system in which processing is performed via a network, such as a LAN, so long as they can perform the function of the present invention.

Figure 30:
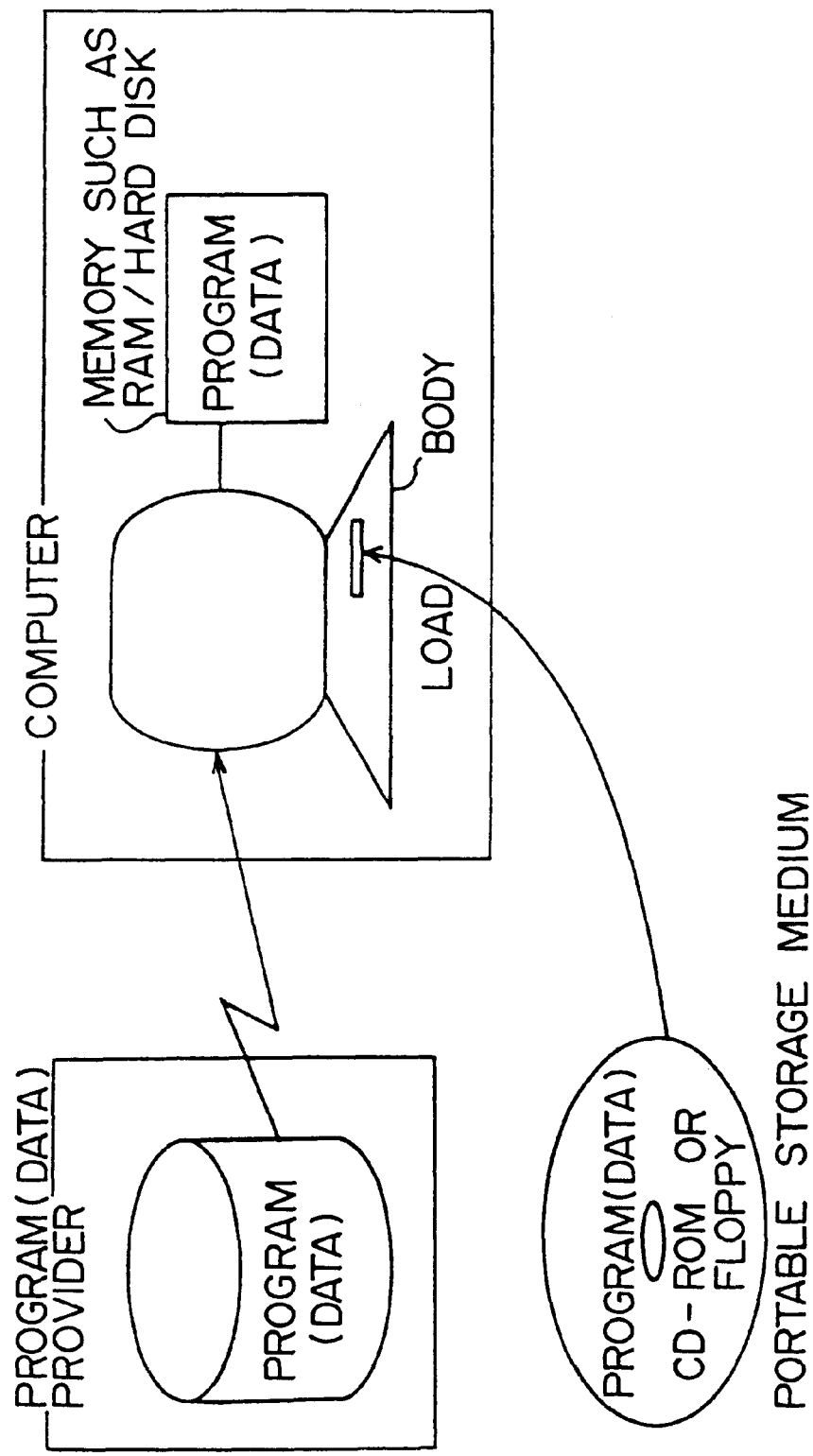
FIG. 30 shows an implementation of the present invention using a recording medium.

Also, as shown in FIG. 30, the present invention can be carried out by loading a recording medium (e.g., a ROM, a hard disk, or a floppy disk) recorded with program code for implementing the device according to each of the embodiments described previously into a system or device and causing a computer (a CPU or an MPU) in the system or device to read and execute the program code stored on the recording medium.

In this case, the program code itself read from the recording medium implements the novel function of the present invention and the recording medium recorded with the program code is therefore an implementation of the present invention.

As a recording medium for the program code use may be made of a floppy disk, a hard disk, an optical disk, an opto-magnetic disk, a CD-ROM, a CD-R (Compact Disk Rewritable), magnetic tape, a nonvolatile memory card, a ROM, or a type of recording medium which can be recorded through the use of a network (or communications line) such as electronic mail or personal computer communications.

The functions of the previously described embodiments are performed by the computer executing the read program code. Or, the OS operating on the computer can perform part or all of actual processes as instructed by the program code to implement the function of the present invention.

Furthermore, the function of the present invention can also be implemented through the use of an expansion board inserted into a computer or an expansion unit attached to the computer. That is, the program code read from the recording medium is written into a memory on the expansion board or expansion unit and a CPU on the expansion board or unit performs part or all of actual processes as instructed by the program code to thereby implement the function of the present invention.

As described above, in sharing services among servers, the present invention can allocate loads for severs automatically and efficiently even with variations in server configuration or server status. Therefore, a client can obtain a quick supply of service and no temporary service stop will occur.

What is claimed is:

1. A network load balancing device for use in a system in which data is transferred from a client to a plurality of servers, each capable of performing data processing, over a network, said network load balancing device comprising:
   a conversion information storage unit to store conversion information representing a correspondence relationship of the client to one of the servers;
   a distributive relay unit to transfer data sent by the client to one or more of the servers on the basis of the conversion information storage unit;
   a distribution ratio adjusting unit to adjust the correspondence relationship in the conversion information stored in the conversion information storage unit; and
   a load measuring unit to measure a load on one of the servers and to notify the distribution ratio adjusting unit of load conditions of one of the servers to thereby allow the distribution ratio adjusting unit to adjust the correspondence relationship in the conversion information stored in the conversion information storage unit;
   wherein the conversion information storage unit includes a table in which the correspondence relationship of the client to the servers is established and a unit to maintain the correspondence relationship of the client to one of the servers throughout transmission of a sequence of data, the distribution ratio adjusting unit having a unit, when the measurement of the load on each server shows an abnormal value, to judge whether one of the servers is in a stopped state, a unit to compare a connection average time and the number of connections for each of the servers with a connection average time reference value and a number-of connections reference value which are a minimum connection average time and a maximum number of connections for one of the servers, respectively, and judging that one of the servers is over loaded for which the connection average time is sufficiently larger than a corresponding reference value and the number of connections is sufficiently smaller than the corresponding reference value, a management unit to manage a service distribution ratio to one of the servers as numbers allocated to one of the servers, the management unit including a stopped state management unit, in the presence of the servers considered to be in the stopped state, to distribute the allocated number of the servers to the servers which are not in the stopped state at the ratio of the allocated numbers of the servers and an over load management unit decreasing the allocated number of the servers considered to be over loaded and to increase the allocated numbers of the servers which are not over loaded and the over load management unit including a unit decreasing the incremental or decremental value of the allocated numbers of the servers with each adjustment cycle to thereby converge a distribution ratio for said servers, and the load measuring unit includes a unit to periodically measure the connection average time and the number of connections per unit time for each of the servers on the basis of data relayed to it and to notify the distribution ratio adjusting unit of the statuses of the servers.

2. The device according to claim 1, further comprising a status management unit to preserve a status before adjustment and to restore the status to an original status at recovery time.

3. The device according to claim 1, wherein the load measuring unit includes a unit to measure the number of connection errors and the number of connections per unit time for each of the severs on the basis of data relayed to each server and to notify the distribution ratio adjustment unit of the measurements at regular intervals, and the distribution ratio adjusting unit further includes a unit, when the measurement of the load on each server shows an abnormal value, to judge whether each server is in a stopped state, compares a connection error rate and the number of connections for each of the servers with a connection error rate reference value and a number-of-connections reference value which are a minimum connection error rate, which is represented by the ratio of the number of connection errors to the number of connections, and a maximum number of connections for the servers, respectively, and to consider whether one of the servers is over loaded based on whether the connection error rate is sufficiently larger than a corresponding reference value and the number of connections is sufficiently smaller than the corresponding reference value.

4. The device according to claim 3, further comprising a unit to allow an operator to set the connection error rate reference value and the number-of-connection reference value for over load judgment in the distribution ratio adjusting unit.

5. The device according to claim 4, wherein the distribution ratio adjustment unit further includes said unit for judging whether each server is in a stopped state, to preserve reference values at that point, and to employ the preserved reference values after recovery of the detected stopped servers.

6. The device according to claim 5, wherein the distribution ratio adjustment unit further includes a unit to determine an increment or decrement value for the number of slots allocated to one of the servers when the one server is considered to be over loaded according to the number of slots which has already been allocated to the one server at that time.

7. The device according to claim 6, wherein the distribution ratio adjustment unit further includes a unit to distribute the number of slots assigned to the servers, when one of the servers is considered to be over loaded, to all other servers which are not over loaded according to the ratio of the numbers of slots assigned to the servers at that time.

8. A network load balancing device for use in a system in which data is transferred from a client to a plurality of servers, each capable of performing data processing, over a network, said network load balancing device comprising:

a conversion information storage unit to store conversion information representing a correspondence relationship of the client to one of the servers;

a distributive relay unit to transfer data sent by the client to one or more of the servers on the basis of the conversion information stored in the conversion information storage unit;

a distribution ratio adjusting unit to adjust the correspondence relationship in the conversion information stored in the conversion information storage unit; and a load measuring unit to measure loads on one of the servers and to notify the distribution ratio adjusting unit of load conditions of one of the servers to thereby allow the distribution ratio adjusting unit to adjust the correspondence relationship in the conversion information stored in the conversion information storage unit;

wherein the conversion information storage unit includes a table in which a correspondence relationship of the client to the servers is established and a unit to maintain the correspondence relationship throughout transmission of a sequence of data, and the distribution ratio adjusting unit having a unit, when the measurement of a load on each server shows an abnormal value, to judge whether one of the servers is in a stopped state, and stopped state management unit to manage a distribution ratio to the servers as allocated numbers for the servers in said table and, in the presence of one of the servers considered to be in the stopped state, to distribute the allocated number of one of the servers to the servers which are not in the stopped state at the ratio of the allocated numbers of servers.

9. The device according to claim 8, wherein the load measuring unit measures load on each of the servers on the basis of an average time of connecting the data to each server per unit time and the number of connections of the data to each server per unit time.

10. The device according to claim 9, wherein the distribution ratio adjusting unit judges whether each of the servers is over loaded on the basis of the average time of connecting and the number of connections of data to each server and adjusts a ratio of distribution of the data to the servers to thereby balance the load on each of the servers.

11. The device according to claim 8, wherein the load measuring unit further includes a unit to measure the number of virtual circuits per unit time for each of the servers on the basis of data relayed to each server and notifies the distribution ratio adjusting unit of a measurement at regular intervals, and the distribution ratio adjustment unit further includes a unit to consider one of the servers for which the number of virtual circuits exceeds a preset reference value as being over loaded.

12. The device according to claim 8, wherein the load measurement unit measures a response time between a commencement and termination of transmission for each of the servers on the basis of data relayed to each server and notifies the distribution ratio adjustment unit of a result at regular intervals, and the distribution ratio adjustment unit further includes a unit considering one of the servers to be over loaded when the response time exceeds a preset reference value.

13. The device according to claim 8, wherein the client is a client computer connected to the network, the servers are server computers connected to the network, and the conversion information storage unit includes said table from the client to the servers.

14. A network load balancing device for use in a system in which data is transferred from a client to a plurality of servers, each capable of performing data processing, over a network, said network load balancing device comprising:

a conversion information storage unit to store conversion information representing a correspondence relationship of the client to one of the servers;

a distributive relay unit to transfer data sent by the client to one or more of the servers on the basis of the conversion information stored in the conversion information storage unit;

a distributive ratio adjusting unit to adjust the correspondence relationship in the conversion information stored in the conversion information storage unit; and a load measuring unit to measure loads on one of the servers and to notify the distribution ratio adjusting unit of load conditions of one of the servers to thereby allow the distribution ratio adjusting unit to adjust the correspondence relationship in the conversion information stored in the conversion information storage unit;

wherein the load measurement unit performs an operation determined by imitating the client in data sent by each of the servers, to measure a service time required to perform the operation, and to notify the distribution ratio adjustment unit of an average service time, and the distribution ratio adjustment unit further includes a unit to decide that one of the servers is over loaded when the average service time is larger than a preset reference value.

15. The device according to claim 14, wherein the distribution ratio adjusting unit further includes a unit to seek an average of measured values of loads on the servers and then to determine the numbers of slots allocated for the servers whose measured values differ from the average by a predetermined width according to a ratio among their distances from the average.

16. The device according to claim 15, further comprising failure monitor unit to perform a ping command to each of the servers at regular intervals, to decide that the servers that cause a certain number of time-outs are a stopped state, and notifies the distribution ratio adjusting unit of the stopped state.

17. The device according to claim 16, further comprising a unit to connect the servers, of a multisegment configuration, to another network.

18. The device according to claim 16, wherein the failure monitor unit further includes a unit to determine whether it is possible to open a service port to transmit information from each of the servers, to decide, after a certain number of failures, that the transmit information is being stopped, and to notify the distribution ratio adjusting unit that the transmit information is being stopped.

19. The device according to claim 18, wherein one of the servers includes the network load balancing device.

20. The device according to claim 18, further comprising another communication path directed from one of the servers to the client in addition to a communication path that passes through the network load balancing device.

21. A network load balancing method for use with a system in which data is transferred from a client to a plurality of servers, each capable of performing data processing, over a network, said network load balancing method comprising:

storing conversion information which represents a correspondence relationship of the client to one of the servers, wherein the conversion information includes a table in which the correspondence relationship of the client to the server is established;

transferring the data sent by the client to one or more of the servers according to the correspondence relationship in the conversion information stored by the storing conversion information;

adjusting the correspondence relationship in the conversion information stored by the storing conversion information; and measuring the load on each of the servers and adjusting the correspondence relationship in the conversion information according to load conditions of each of the servers, wherein the network load balancing method further includes maintaining the correspondence relationship throughout transmission of a sequence of data, judging whether one of the servers is in a stopped state based on when the measurement of a load on each server shows an abnormal value, managing a distribution ratio to the servers as allocated numbers for the servers in said table and, in the presence of one of the servers considered to be in the stopped state, distributing the allocated number of one of the servers to the servers which are not in the stopped state at the ratio of the allocated numbers of servers.

22. A network load balancing program for use with a system in which data is transferred from a client to a plurality of servers, each capable of performing data processing, over a network, a computer-readable recording medium comprising the network load balancing program that allows a computer to perform:

storing conversion information which represents a correspondence relationship of the client to one of the servers, wherein the conversion information includes a table in which the correspondence relationship of the client to the server is established;

transferring the data sent by the client to one or more of the servers according to the correspondence relationship in the stored conversion information;

adjusting the correspondence relationship in the stored conversion information; and measuring a load on each of the servers and adjusting the correspondence relationship in the conversion information according to the load conditions of each of the servers, wherein the network load balancing program further allows a computer to perform maintaining the correspondence relationship throughout transmission of a sequence of data, judging whether one of the servers is in a stopped state based on when the measurement of a load on each server shows an abnormal value, managing a distribution ratio to the servers as allocated numbers for the servers in said table and, in the presence of one of the servers considered to be in the stopped state, distributing the allocated number of one of the servers to the servers which are not in the stopped state at the ratio of the allocated numbers of servers.

23. A network load balancing system which includes a client that sends data, a plurality of servers, each capable of performing data processing, which receives the data, and a third control unit which transfers the data sent by the client to one of the servers, the third control unit comprising:

a conversion information storing unit to store conversion information which represents a correspondence relationship of the client to each of the servers;

a distributive relay unit to transfer the data sent by a first server to one or more of the servers according to the correspondence relationship in the conversion information stored in the conversion information storing unit;

a distribution ratio adjusting unit to adjust the correspondence relationship in the conversion information stored in the conversion information storing unit; and a load measuring unit to measure a load on each of the servers and to notify the distribution ratio adjusting unit of load conditions of the servers in order to allow the distribution ratio adjusting unit to adjust the correspondence relationship in the conversion information stored in the conversion information storing unit.

24. A load balancing device for use with a system in which data is sent from a client to a plurality of servers, each capable of performing data processing, said balancing device comprising:

a conversion information storing unit to store conversion information which represents a correspondence relationship of the client to each of the servers;

a distributive relay unit to transfer the data sent by the client to one or more of the servers according to the correspondence relationship in the conversion information stored in the conversion information storing unit;

a distribution ratio adjusting unit to adjust the correspondence relationship in the conversion information stored in the conversion information storing unit; and a load measuring unit to measure a load on each of the servers and to notify the distribution ratio adjusting unit of load conditions of the servers in order to allow the distribution ratio adjusting unit to adjust the correspondence relationship in the conversion information stored in the conversion information storing unit.

25. A control device for use with a system in which data is sent from a client to a plurality of servers, each capable of performing data processing, said control device comprising:

a conversion information storing unit to store conversion information which represents a correspondence relationship of the client to each of the servers; and a distributive relay unit to transfer the data sent by the client to one or more of the servers according to the correspondence relationship in the conversion information stored in the conversion information storing unit, wherein the conversion information storage unit includes a table in which a correspondence relationship of the client to the servers is established and a unit to maintain the correspondence relationship throughout transmission of a sequence of data, and the distributive relay unit having a unit, when the measurement of a load on each server shows an abnormal value, to judge whether one of the servers is in a stopped state, and stopped state management unit to manage a distribution ratio to the servers as allocated numbers for the servers in said table and, in the presence of one of the servers considered to be in the stopped state, to distribute the allocated number of one of the servers to the servers which are not in the stopped state at the ratio of the allocated numbers of servers.

26. A network load balancing device for use with a system in which data is sent from a client to a plurality of servers, each capable of performing data processing, said network load balancing device comprising:

a unit to store relevant data so that sent data will be processed in a corresponding one of the servers; and a unit to determine whether each of the servers is over loaded and, if one of said servers is overloaded, to balance a load on the remaining servers that are not overloaded so that the load will be distributed to the remaining servers that are not overloaded, wherein the unit to store relevant data includes a table in which a correspondence relationship of the client to the servers is established and a unit to maintain the correspondence relationship throughout transmission of a sequence of data, and the unit to determine whether each of the servers is overloaded having a unit, when the measurement of a load on each server shows an abnormal value, to judge whether one of the servers is in a stopped state, and stopped state management unit to manage a distribution ratio to the servers as allocated numbers for the servers in said table and, in the presence of one of the servers considered to be in the stopped state, to distribute the allocated number of one of the servers to the servers which are not in the stopped state at the ratio of the allocated numbers of servers.

* * * * *